(12) United States Patent
Shin et al.

(10) Patent No.: US 11,366,532 B2
(45) Date of Patent: Jun. 21, 2022

(54) ELECTRONIC DEVICE INCLUDING ANTENNA STRUCTURE

(71) Applicant: Samsung Electronics Co., Ltd., Gyeonggi-do (KR)

(72) Inventors: Yongjoo Shin, Gyeonggi-do (KR); Yongwoon Kim, Gyeonggi-do (KR); Nayoung Chu, Gyeonggi-do (KR); Jinwan An, Gyeonggi-do (KR); Jiwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/252,411

(22) PCT Filed: Jun. 19, 2019

(86) PCT No.: PCT/KR2019/007399
§ 371 (c)(1),
(2) Date: Dec. 15, 2020

(87) PCT Pub. No.: WO2019/245283
PCT Pub. Date: Dec. 26, 2019

(65) Prior Publication Data
US 2021/0373679 A1     Dec. 2, 2021

(30) Foreign Application Priority Data

Jun. 20, 2018 (KR) .......................... 10-2018-0071034

(51) Int. Cl.
*G06F 3/0354* (2013.01)
*H01Q 1/24* (2006.01)

(52) U.S. Cl.
CPC ......... *G06F 3/03545* (2013.01); *H01Q 1/243* (2013.01); *G06F 2203/0384* (2013.01)

(58) Field of Classification Search
CPC ........ G06F 3/03545; G06F 2203/0384; H01Q 1/243
See application file for complete search history.

(56) References Cited

U.S. PATENT DOCUMENTS

2015/0349407 A1* 12/2015 Nishizaka .............. H01Q 1/243
343/702
2015/0363013 A1* 12/2015 Coutts ................... G06F 3/0393
345/179

(Continued)

FOREIGN PATENT DOCUMENTS

KR        10-1270528 B1 *  6/2013
KR     10-2018-0035606 A      4/2018

*Primary Examiner* — Ankur Jain
*Assistant Examiner* — Angelica M Perez
(74) *Attorney, Agent, or Firm* — Cha & Reiter, LLC

(57) ABSTRACT

One or more embodiments disclosed herein relate to an electronic device antenna structure, and may provide an electronic device that includes a pen housing including a first end part, a second end part, and inner space; a printed circuit board (PCB) located in the inner space; and an antenna structure. The antenna structure may include a first conductive part located between the pen housing and the first surface of the PCB; a second conductive part electrically connected to the first conductive; and a third conductive part electrically connected to the first conductive part. At least one part of the PCB may be arranged between the second conductive part and the third conductive part when the first surface of the PCB is viewed from an upper surface thereof. Additional other embodiments can be provided.

15 Claims, 19 Drawing Sheets

(56) References Cited

U.S. PATENT DOCUMENTS

2017/0010697 A1* 1/2017 Jiang .................. G06F 3/03545
2018/0088690 A1* 3/2018 Seo .................... G06F 3/03545

* cited by examiner

ELECTRONIC DEVICE INCLUDING ANTENNA STRUCTURE

This application is a National Phase Entry of PCT international Application No. PCT/KR2019/007399, which was filed on Jun. 19, 2019, and claims priority to Korean Patent Application No. 10-2018-0071034 filed on Jun. 20, 2018, in the Korean Intellectual Property Office, the contents of which are incorporated herein by reference.

BACKGROUND

1. Field

Various embodiments of the disclosure relate to an antenna structure for communication with an external electronic device and an electronic device including the same.

2. Description of the Related Art

Recently, portable electronic devices such as smartphones or tablet PCs have been actively popularized, and technology for a pen input device applicable to such portable electronic devices has also been actively developed. The smartphone or the tablet PC mainly includes a touchscreen, and a user can thus designate specific coordinates on the touchscreen by using a finger or a pen input device. The user can input a specific signal in a smartphone by designating a specific coordinates on the touchscreen.

SUMMARY

In installing an antenna in an electro-magnetic resonant (EMR) type pen input device, the positions of electronic components and circuit components, the number of hand grips, etc. may be considered for smooth communication between an electronic device and a pen input device. In an embodiment, optimal antenna performance may not be realized due to electromagnetic interference between electronic components and an antenna or between circuit components and the antenna. In an embodiment, antenna radiation efficiency may be reduced by the hand grip of a user, and thus optimal antenna performance may not be realized.

In an embodiment, a mechanism including an antenna may not be stably fixed in a pen housing, and thus poor contact may be caused between the mechanism and circuit components. This phenomenon may frequently occur during use of a pen input device, and thus user input using the pen input device may not be reflected as desired.

According to one embodiment, in the process of assembling a mechanism including an antenna (e.g., a flexible antenna) with a pen housing, a portion, on which a conductive pattern is formed, may be damaged, such as punctured, torn, folded, or the like.

Various embodiments of the disclosure may provide an electronic device including an antenna structure capable of reducing electronic interference as much as possible for smooth data communication between the electronic device and a pen input device.

Various embodiments of the disclosure may provide an electronic device including an antenna structure, which can solve the problems of poor contact and susceptibility to damage.

Various embodiments of the disclosure may provide an electronic device including: a pen housing, which is elongated, includes a first end and a second end, and includes an inner space; a tip, which has a sharp end, is formed of a dielectric, and is positioned at the first end; a printed circuit board (PCB), which is elongated, is positioned in the inner space, and includes a first surface facing a first direction and a second surface facing a second direction opposite to the first direction; a wireless communication circuit, which is positioned on the printed circuit board in the inner space; and an antenna structure, which is positioned in the inner space and is electrically connected to the wireless communication circuit, wherein the antenna structure includes: a first conductive portion, which is positioned between the pen housing and the first surface of the printed circuit board; a second conductive portion, which extends along the printed circuit board and is electrically connected to the first conductive portion in a third direction, which is different from the first direction and the second direction; and a third conductive portion, which extends along the printed circuit board and is electrically connected to the first conductive portion in a fourth direction, which is different from the first direction, the second direction, and the third direction, and the printed circuit board is at least partially disposed between the second conductive portion and the third conductive portion when the first surface of the printed circuit board is seen from above.

Various embodiments of the disclosure may provide an electronic device including: a pen housing, which is elongated, includes a first end and a second end, and includes an inner space; a tip, which has a sharp end, is formed of a dielectric, and is positioned at the first end; a printed circuit board (PCB), which is elongated, is positioned in the inner space, and includes a first surface facing a first direction, a second surface facing a second direction opposite to the first direction, and multiple layers provided between the first surface and the second surface; a wireless communication circuit, which is positioned on the printed circuit board in the inner space; a first conductive pattern, which is formed on a first layer of the multiple layers and is electrically connected to the communication circuit; a second conductive pattern, which is formed on a second layer separate from the first layer among the multiple layers; and at least one conductive via, which is formed in the printed circuit board and is electrically connected to the first conductive pattern and the second conductive pattern.

Various embodiments may provide an electronic device including: a terminal housing, which includes a first plate, a second plate oriented in a direction opposite to the first plate, and a side member surrounding a receiving space between the first plate and the second plate; an opening formed in the side member and connected to the receiving space; and a pen input device formed to be inserted into the receiving space through the opening, wherein the pen input device includes: a pen housing formed in an elliptical shape having a major axis and a minor axis when seen in a cross section; a printed circuit board (PCB), which is positioned in an inner space of the pen housing and includes a first surface facing a first direction and a second surface facing a second direction opposite to the first direction; a wireless communication circuit positioned on the printed circuit board in the inner space; an antenna structure, which is positioned in the inner space and is electrically connected to the wireless communication circuit, the antenna structure includes: a first conductive portion, which is positioned between the pen housing and the first surface of the printed circuit board; a second conductive portion, which extends along the printed circuit board and is electrically connected to the first conductive portion in a third direction, which is different from the first direction and the second direction; and a third conductive portion, which extends along the printed circuit board and is electrically connected to the first conductive portion in a fourth direction, which is different from the first direction, the second direction, and the third direction, and the printed circuit board is at least partially disposed between the second conductive portion and the third conductive portion when the first surface of the printed circuit board is seen from above.

According to various embodiments of the disclosure, it is possible to provide not a passive pen input device configured to perform pen input simply by pressing an electronic device having a display but a pen input device for actively communicating with an electronic device.

According to various embodiments of the disclosure, it is possible to mount electronic components or circuit components on each of a first surface and a second surface of a printed circuit board in order to use the limited inner space of a pen housing.

Further, it is possible to provide an antenna structure that has not a simple two-dimensional shape but a three-dimensional shape so as to correspond to a printed circuit board assembly having a predetermined height.

DETAILED DESCRIPTION

Hereinafter, various embodiments of the disclosure will be described with reference to the accompanying drawings.

Figure 1:
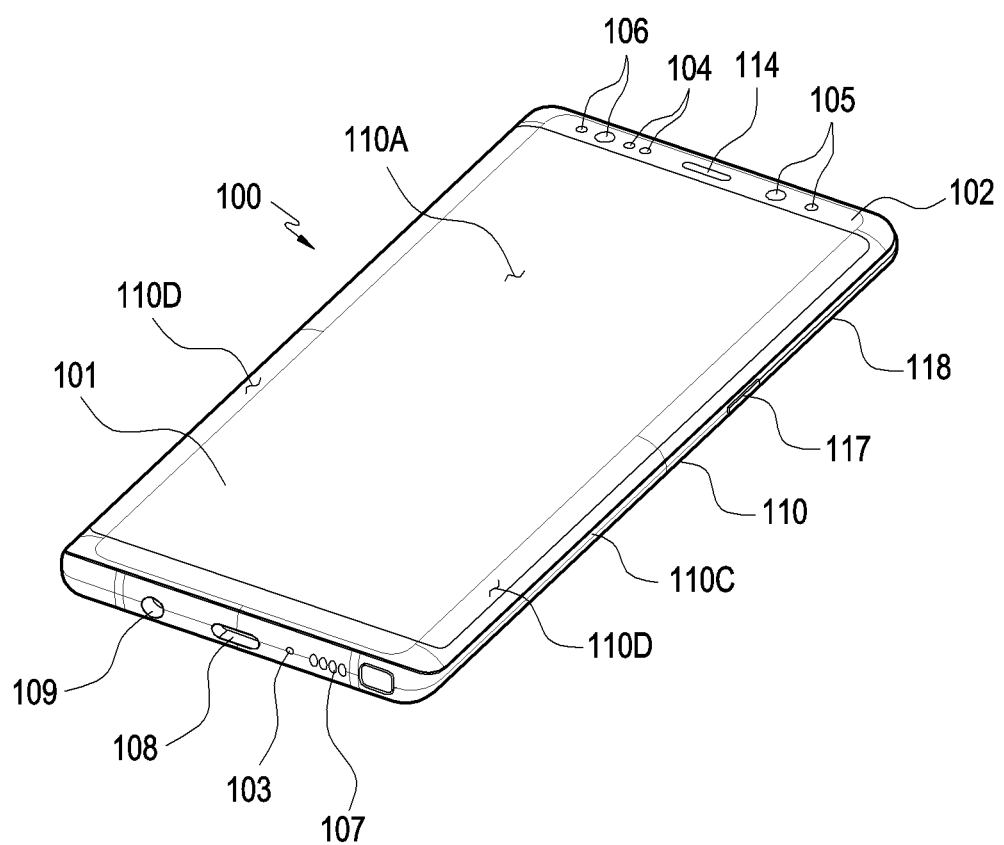
FIG. 1 is a perspective view of the front surface of an electronic device according to various embodiments.
Figure 2:
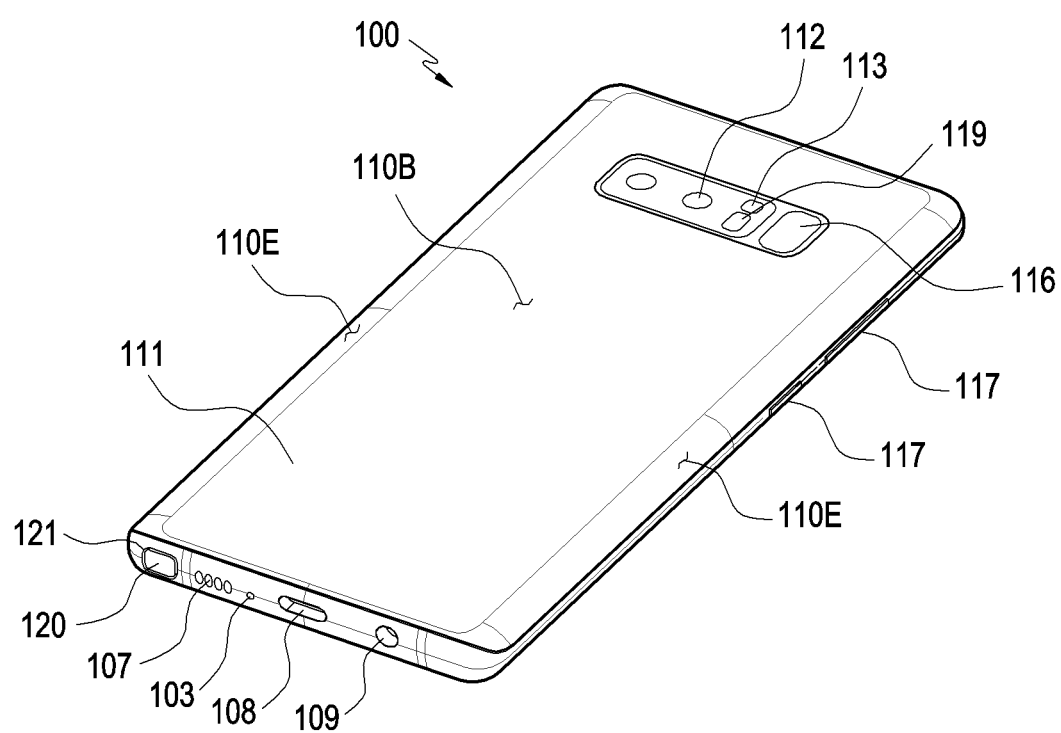
FIG. 2 is a perspective view of the rear surface of the electronic device in FIG. 1.

Referring to FIGS. 1 and 2, the electronic device 100 according to one embodiment may include a housing 110 including: a first surface (or a front surface) 110A; a second surface (or a rear surface) 110B; and a side surface 110C surrounding the space between the first surface 110A and the second surface 110B. In another embodiment (not shown), the housing may refer to a structure forming some of the first surface 110A, the second surface 110B, and the side surface 110C in FIG. 1. According to one embodiment, the first surface 110A may be formed of a front plate 102 (e.g., a polymer plate or a glass plate including various coating layers), at least a part of which is substantially transparent. The second surface 110B may be formed of a substantially opaque rear plate 111. The rear plate 111 may be formed of, for example, coated or colored glass, ceramic, polymer, metal (e.g., aluminum, stainless steel (STS), or magnesium), or a combination of at least two of the above-described materials. The side surface 110C may be coupled to the front plate 102 and the rear plate 111, and may be formed of a side bezel structure (or "a side member") 118 which contains metal and/or a polymer. In an embodiment, the rear plate 111 and the side bezel structure 118 may be integrally formed, and may contain the same material (e.g., a metal material such as aluminum).

In the illustrated embodiment, the front plate 102 may include two first regions 110D, which are provided at the long edge of both ends of the front plate 102 and are bent and seamlessly extend from the first surface 110A to the rear plate 111. In an illustrated embodiment (see FIG. 2), the rear plate 111 may include two second regions 110E, which are provided at the long edge of both ends thereof and are bent and seamlessly extend from the second surface 110B to the front plate 102. In an embodiment, the front plate 102 (or the rear plate 111) may include only one of the first regions 110D (or the second regions 110E). In another embodiment, some of the first regions 110D or second regions 110E may not be included. In the above-described embodiments, when the electronic device 100 is seen from the side thereof, the side bezel structure 118 may have a first thickness (or width) at a side surface that does not include the first regions 110D or the second regions 110E, and may have a second thickness, which is smaller than the first thickness, at a side surface that includes the first regions 110D or the second regions 110E.

According to one embodiment, the electronic device 100 may include at least one among: a display 101; audio modules 103, 107, and 114; sensor modules 104, 116, and 119; camera modules 105, 112, and 113; key input devices 117; a light-emitting element 106; a pen input device 120; and connector holes 108 and 109. In an embodiment, in the electronic device 100, at least one of the elements (e.g., the key input devices 117 or the light-emitting element 106) may be omitted or another element may be additionally included.

The display 101 may be exposed through, for example, a considerable portion of the front plate 102. In an embodiment, the display 101 may be at least partially exposed through the front plate 102, which forms the first surface 110A and the first regions 110D of the side surface 110C. In an embodiment, the edge of the display 101 may be formed to have a shape mostly identical to the shape of the outer edge of the front plate 102 adjacent thereto. In another embodiment (not shown), in order to increase the exposed area of the display 101, the gaps between the outer edges of the display 101 and the outer edges of the front plate 102 may be formed to be approximately equal to each other.

In another embodiment (not shown), a recess or an opening is formed in a part of the screen display region of the display 101, and the electronic device may include at least one of the audio module 114, the sensor module 104, the camera module 105, and the light-emitting element 106, aligned with the recess or the opening. In another embodiment (not shown), at least one of the audio module 114, the sensor module 104, the camera module 105, the fingerprint sensor 116, and the light-emitting element 106 may be included in the rear surface of the screen display region of the display 101. In another embodiment (not shown), the display 101 may be coupled to or disposed adjacent to a touch-sensing circuit, a pressure sensor capable of measuring the strength (pressure) of touch, and/or a digitizer for detecting a pen input device using a magnetic field. In an embodiment, at least some of the sensor modules 104 and 119 and/or at least some of the key input devices 117 may be disposed in the first regions 110D and/or the second regions 110E.

The audio modules 103, 107, and 114 may include a microphone hole 103 and speaker holes 107 and 114. A microphone for acquiring external sound may be disposed in the microphone hole 103, and in an embodiment, multiple microphones may be disposed so as to sense the direction of sound. The speaker holes 107 and 114 may include an outer speaker hole 107 and a calling receiver hole 114. In an embodiment, the speaker holes 107 and 114 and the microphone hole 103 may be implemented as a single hole, or a speaker (e.g., a Piezo speaker) may be included without the speaker holes 107 and 114.

The sensor modules 104, 116, and 119 may generate an electrical signal or a data value, which corresponds to an operational state inside the electronic device 100 or an environment state outside the electronic device 100. The sensor modules 104, 116, and 119 may include, for example, a first sensor module 104 (e.g., a proximity sensor) and/or a second sensor module (not shown) (e.g., a fingerprint sensor), disposed in the first surface 110A of the housing 110, and/or a third sensor module 119 (e.g., an HRM sensor) and/or a fourth sensor module 116 (e.g., a fingerprint sensor), disposed in the second surface 110B of the housing 110. The fingerprint sensor may be disposed not only in the first surface 110A (e.g., the display 101) of the housing 110 but also in the second surface 110B of the housing 110. The electronic device 100 may further include at least one of sensor modules that are not shown, for example, a gesture sensor, a gyro sensor, an air-pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include: a first camera device 105 disposed in the first surface 110A of the electronic device 100; and a second camera device 112 and/or a flash 113, disposed in the second surface 110B thereof. Each of the camera modules 105 and 112 may include one or multiple lenses, an image sensor, and/or an image signal processor. The flash 113 may include, for example, a light-emitting diode or a xenon lamp. In an embodiment, two or more lenses (infrared camera, wide-angle, and telephoto lenses) and image sensors may be disposed at one surface of the electronic device 100.

The key input devices 117 may be disposed on the side surface 110C of the housing 110. In another embodiment, the electronic device 100 may not include some or all of the above-described key input devices 117, and the key input devices 117 that are not included in the electronic device 100 may be implemented in other forms, such as a soft key, on the display 101. In an embodiment, a key input device may include the sensor module 116 disposed in the second surface 110B of the housing 110.

The light-emitting element 106 may be disposed, for example, in the first surface 110A of the housing 110. The light-emitting element 106 may provide, for example, information about the state of the electronic device 100 in a light form. In another embodiment, the light-emitting element 106 may provide, for example, a light source operating in conjunction with the operation of the camera module 105. The light-emitting element 106 may include, for example, an LED, an IR LED, and a xenon lamp.

The connector holes 108 and 109 may include: a first connector hole 108 capable of receiving a connector (e.g., a USB connector) for transmitting or receiving power and/or data to or from an external electronic device; and/or a second connector hole (e.g., an earphone jack) 109 capable of receiving a connector for transmitting or receiving an audio signal to or from an external electronic device.

The pen input device 120 (e.g., a stylus pen) may be guided and inserted into or detached from the housing 110 via a hole 121 formed through a side surface of the housing 110, and may include a button for easy attachment and detachment of the pen input device 120. A separate resonance circuit is embedded in the pen input device 120, and may operate in conjunction with an electromagnetic induction panel 390 (e.g., a digitizer) included in the electronic device 100. The pen input device 120 may be an electromagnetic resonance (EMR) type, an active electrical stylus (AES) type, or an electric coupled resonance (ECR) type.

Figure 3:
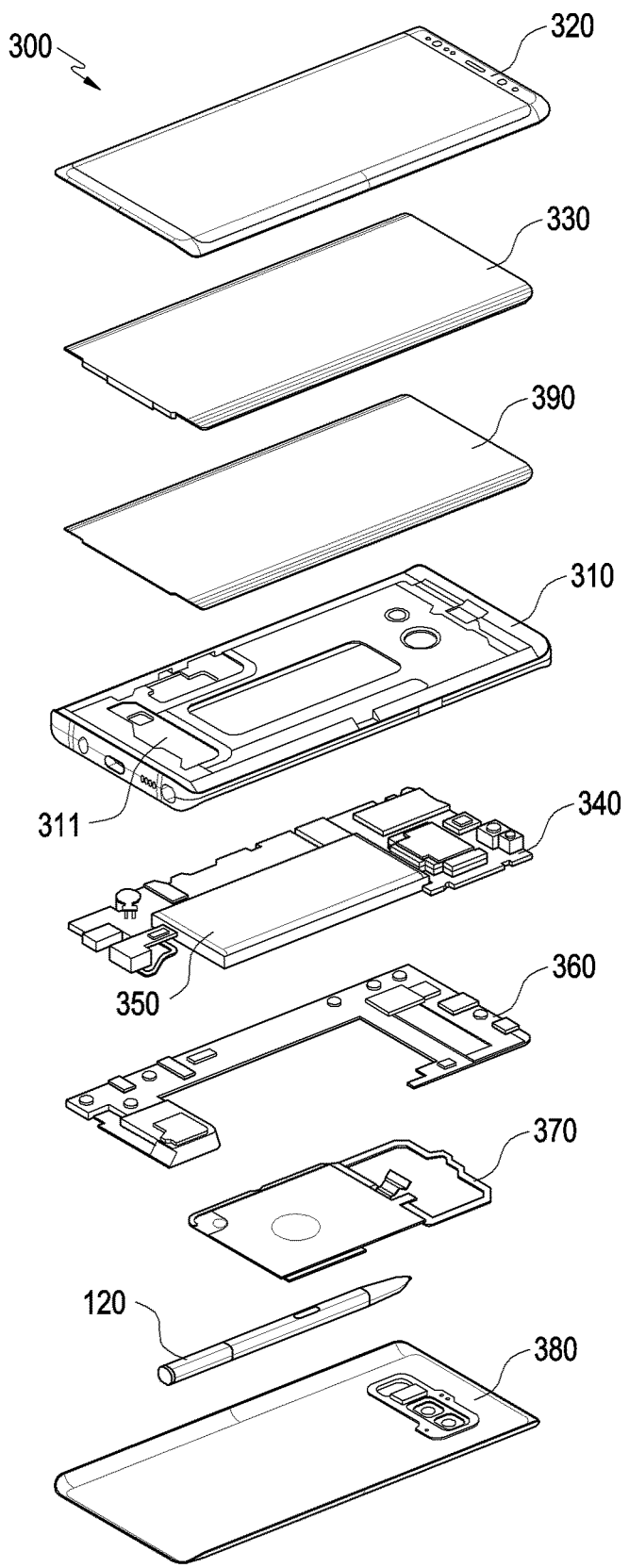
FIG. 3 is an exploded perspective view of the electronic device in FIG. 1.

Referring to FIG. 3, the electronic device 300 may include: a side bezel structure 310; a first support member 311 (e.g., a bracket); a front plate 320; a display 330; the electromagnetic induction panel 390; a printed circuit board 340; a battery 350; a second support member 360 (e.g., a rear case); an antenna 370; a pen input device 120; and a rear plate 380. In an embodiment, in the electronic device 300, at least one of the elements (e.g., the first support member 311 or the second support member 360) may be omitted, or another element may be additionally included. At least one of the elements of the electronic device 300 may be the same as or similar to at least one of the elements of the electronic device 100 in FIG. 1 or 2. Thus, hereinafter, a redundant description will be omitted.

The electromagnetic induction panel 390 (e.g., a digitizer) may be a panel for sensing input through the pen input device 120. For example, the electromagnetic induction panel 390 may include a printed circuit board (PCB) (e.g., a flexible printed circuit board (FPCB)) and a shielding sheet. The shielding sheet may prevent the interference between components (e.g., a display module, a printed circuit board, an electromagnetic induction panel) included in the electronic device 100 due to electromagnetic fields generated by the components. The shielding sheet may shield the electromagnetic fields generated by the components, thereby allowing the input from the pen input device 120 to be accurately transferred to a coil included in the electromagnetic induction panel 390. The electromagnetic induction panel 390 according to various embodiments may include an opening formed in a partial region corresponding to a biometric sensor mounted in the electronic device 100.

The first support member 311 may be disposed inside the electronic device 300, and may be connected to the side bezel structure 310, or may be formed integrally with the side bezel structure 310. The first support member 311 may be formed of, for example, a metal material and/or a non-metal (e.g., polymer) material. The first support member 311 may be coupled to the display 330 at one surface thereof and to the printed circuit board 340 at another surface thereof. A processor, a memory, and/or an interface may be mounted on the printed circuit board 340. The processor may include at least one of, for example, a central processing unit, an application processor, a graphics-processing unit, an image signal processor, a sensor hub processor, or a communication processor.

The memory may include, for example, volatile memory or nonvolatile memory.

The interface may include, for example, a high-definition multimedia interface (HDMI), a universal serial bus (USB) interface, an SD card interface, and/or an audio interface. The interface may electrically or physically connect the electronic device 300 to an external electronic device, and may include a USB connector, an SD card/MMC connector, or an audio connector.

The battery 350 is a device for supplying power to at least one element of the electronic device 300, and may include, for example, a non-rechargeable primary battery, a rechargeable secondary battery, or a fuel cell. At least a part of the battery 350 may be disposed, for example, in substantially the same plane as the printed circuit board 340. The battery 350 may be disposed integrally with the electronic device 300 in the electronic device 300, or may be detachably disposed in the electronic device 300.

The antenna 370 may be disposed between the rear plate 380 and the battery 350. The antenna 370 may include, for example, a near-field communication (NFC) antenna, a wireless charging antenna, and/or a magnetic secure transmission (MST) antenna. For example, the antenna 370 may perform short-range communication with an external device, or may transmit or receive power necessary for charging to or from the external device in a wireless manner. In another embodiment, an antenna structure may be formed by a part of the first support member 311 and/or the side bezel structure 310 or a combination thereof.

Figure 4A:
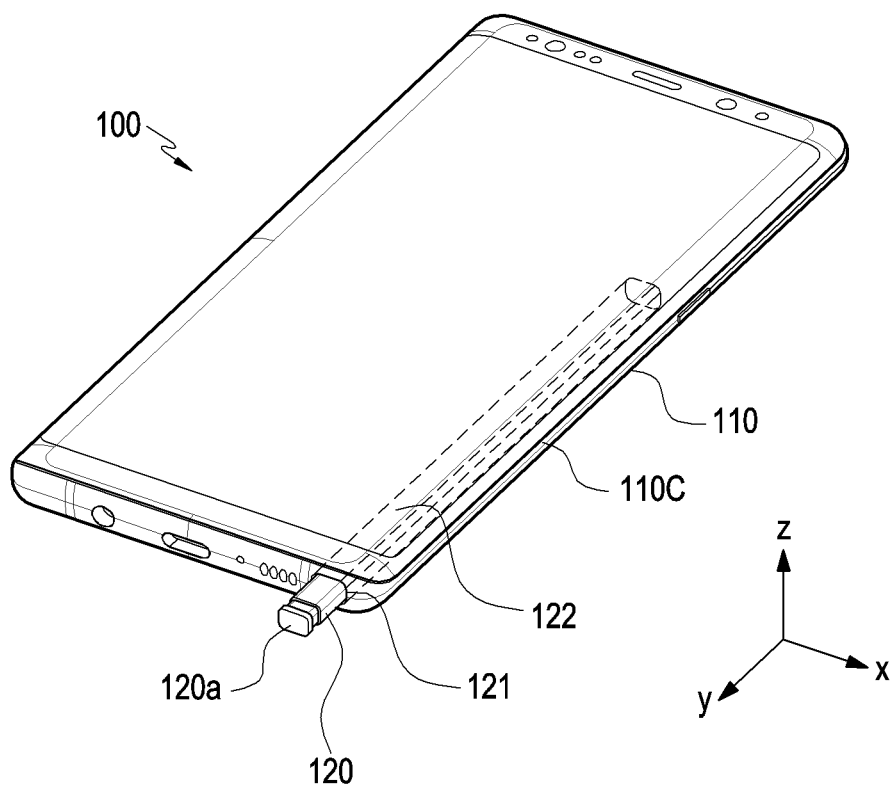
FIG. 4A is a perspective view illustrating an electronic device according to various embodiments and a state in which a pen input device according to various embodiments is partially inserted into the electronic device.
Figure 4B:
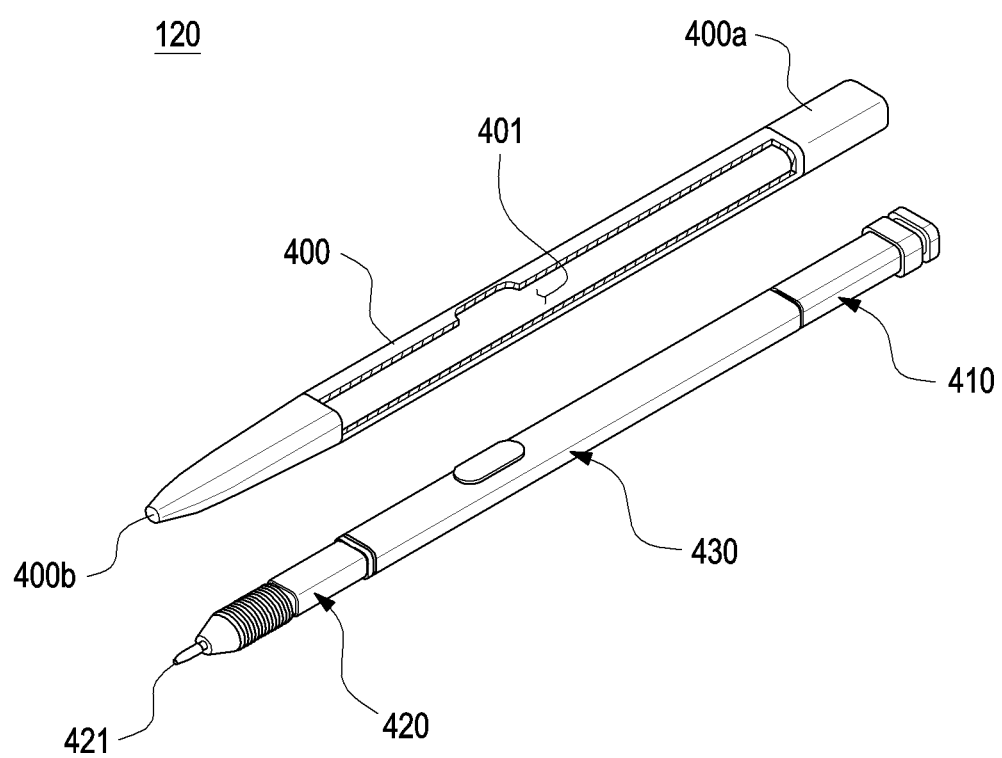
FIG. 4B is a perspective view of a pen input device according to various embodiments.
Figure 4C:
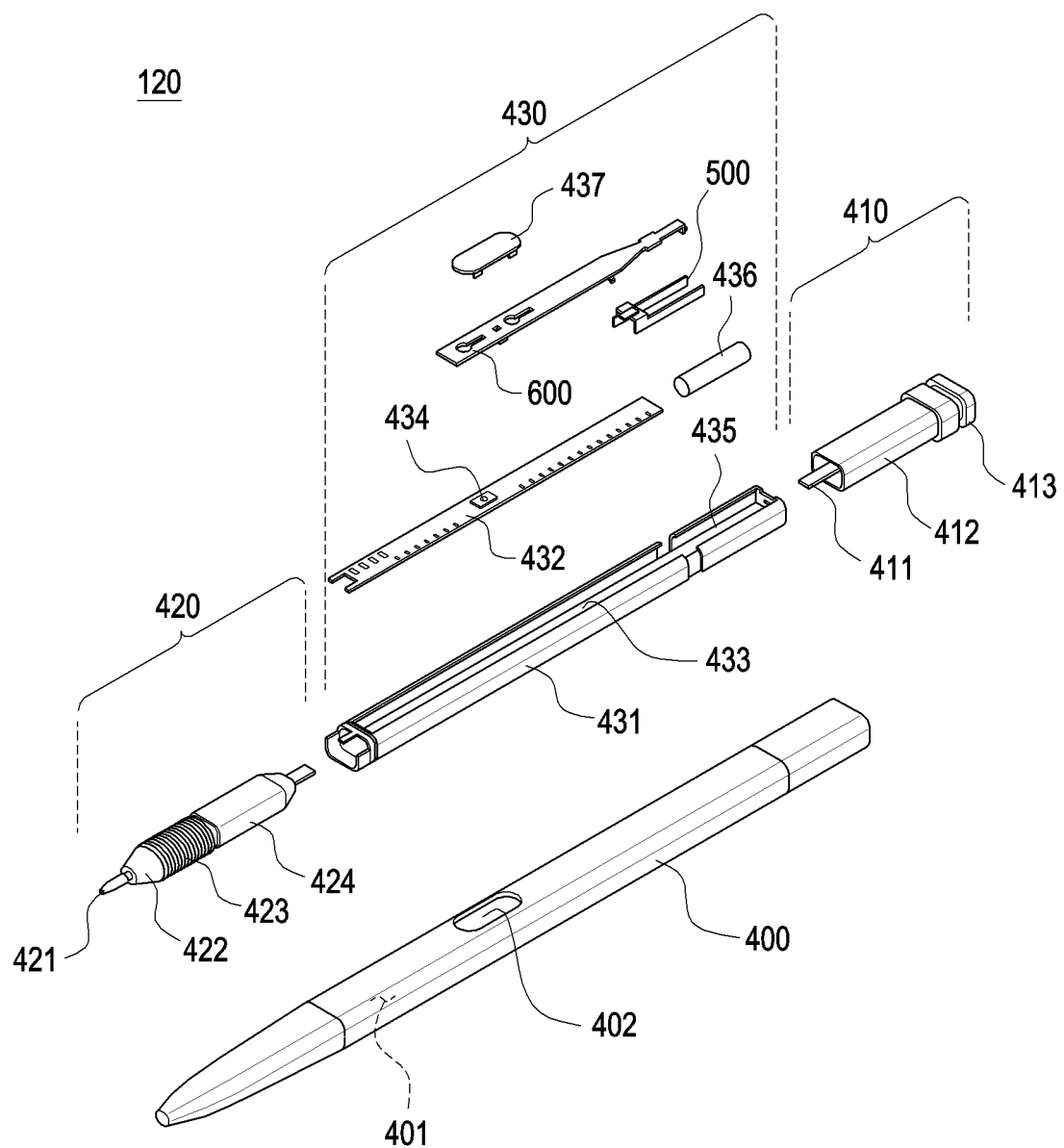
FIG. 4C is an exploded perspective view of a pen input device according to various embodiments.

FIG. 4A is a perspective view illustrating an electronic device 100 according to various embodiments and a state in which a pen input device 120 according to various embodiments is partially inserted into the electronic device 100. FIG. 4B is a perspective view of the pen input device 120 according to various embodiments. FIG. 4C is an exploded perspective view of the pen input device 120 according to various embodiments.

Referring to FIG. 4A, a hole 121 may be formed in one portion of a housing 110 of the electronic device 100, for example, in one portion of a side surface 110C. The electronic device 100 may include a receiving space 122 exposed to the outside through the hole 121, and the pen input device 120 may be inserted into the electronic device 100 through the receiving space 122.

According to various embodiments, the pen input device 120 may include a button part 120a provided at one end thereof, as an element for taking the pen input device 120 out of the receiving space 122 of the electronic device 100. When a user presses the button part 120a, repulsion providing elements (e.g. at least one spring) linked with the button part 120a may operate, and thus the pen input device 120 may be removed from the receiving space 122.

According to various embodiments, the pen input device 120 may include an antenna device capable of communication (e.g. Bluetooth low energy (BLE) communication) with the electronic device 100 when the pen input device 120 is received in the receiving space 122 or when the pen input device 120 is removed from the receiving space 122 and positioned outside the electronic device 100.

Referring to FIG. 4B, the pen input device 120 may include: a pen housing 400 forming the exterior of the pen input device 120; and an inner assembly surrounded by the pen housing 400. The inner assembly may be inserted (retracted) into the pen housing 400, and may be provided integrally with the pen housing 400, wherein the inner assembly is inserted into the pen housing 400 by a single assembly operation to constitute the complete pen input device 120.

According to various embodiments, the pen housing 400 may have a thin and long body overall, and may include a first end part 400a and a second end part 400b, which are positioned at opposite sides, with the body interposed therebetween. Herein, the second end part 400b may have a shape having a width decreasing toward the tip thereof. The pen housing 400 may have an inner space 401 surrounded by the body, the first end part 400a, and the second end part 400b. According to various embodiments, at least one portion of the pen housing 400, for example, the body, may be made of a synthetic resin (e.g. plastic) material. Another portion of the pen housing 400, for example, the first end part 400a, may be made of a metal material (e.g., aluminum).

According to various embodiments, the pen housing 400 may have a cross section having a major axis and a minor axis, and may be formed in the shape of an elliptic cylinder overall. The receiving space 122 of the electronic device 100 may also have an elliptical cross section so as to correspond to the shape of the pen housing 400.

Referring to FIG. 4C, the inner assembly may have a thin and long shape (or an elongated shape) overall so as to correspond to the shape of the pen housing 400. The inner assembly may be divided into three elements along the lengthwise direction thereof. For example, the inner assembly may include: an ejection member 410 disposed at a position corresponding to the first end part 400a of the pen housing 400; a circuit board part 430 disposed at a position corresponding to the body of the pen housing; and a coil part 420 disposed at a position corresponding to the second end part 400b of the pen housing 400.

According to various embodiments, the ejection member 410 of the inner assembly may be an element for ejecting the pen input device 120 from the receiving space 122 of the electronic device 100. According to one embodiment, the ejection member 410 may include: a shaft 411; an ejection body 412 disposed around the shaft 411 and forming the overall exterior of the ejection member 410; and a button part 413. When the inner assembly is completely inserted into the pen housing 400, a part including the shaft 411 and the ejection body 412 may be surrounded by the first end part 400a of the pen housing 400, and the button part 413 (e.g., reference numeral 120a in FIG. 4A) may be exposed out of the first end part 400a. According to various embodiments, the button part 413 may be a push button for providing a user with the sense of click or a button on which a catching structure is formed to allow a user to take out a pen input device by using a fingernail.

According to various embodiments, the coil part 420 of the inner assembly may include: a pen tip 421, exposed out of the second end part 400b when the inner assembly is completely inserted into the pen housing 400; a first packing ring 422 provided for waterproofing and dustproofing; a coil 423 wound with multiple turns; and a pen-pressure-sensing part 424 for obtaining a change in pressure due to the pressing of the pen tip 421. The first packing ring 422 may be made of epoxy, rubber, urethane, or silicone. The first packing ring 422 may be provided for waterproofing and dustproofing, and may protect the coil part 420 and the circuit board part 430 from water and dust. According to various embodiments, a user may perform user input (e.g., writing) in the electronic device 100 by bringing the pen tip 421 into contact with a display of the electronic device 100 and pressing the display by using the pen tip 421.

According to various embodiments, the circuit board part 430 may include: a printed circuit board 432; and a base 431 surrounding at least one surface of the printed circuit board 432. According to one embodiment, a substrate-seating part 433, on which the printed circuit board 432 is disposed, may be formed on the top surface of the base 431, and the printed circuit board 432 may be fixed in the state of being seated on the substrate-seating part 433. Therefore, the printed circuit board 432 may be protected from physical impacts applied to the pen input device 120. According to various embodiments, a switch 434 may be provided on the printed circuit board 432. A side button 437 provided at the pen input device 120 may be used to press the switch 434, and may be exposed to outside through a side opening 402 in the pen housing 400.

In the pen input device 120 according to various embodiments, a battery-seating part 435, on which a battery 436 is disposed, may be formed on the top surface of the base 431. The pen input device 120 may include the battery 436 connectable to the printed circuit board 432 in the battery-seating part 435, and thus may be used to perform an active function (e.g., BLE communication) in addition to being used as a simple writing instrument. The battery 436 mountable on the battery-seating part 435 is not limited to a specific battery 436. For example, a chip-type battery, a cylinder-type battery, or the like may be used as the battery mounted on the battery-seating part 435.

The pen input device 120 according to various embodiments of the disclosure may include an antenna connected to the printed circuit board 432. According to one embodiment, the antenna may be the antenna structure 500 illustrated in FIG. 4C. According to another embodiment, the antenna may be an antenna embedded in the printed circuit board 432, as will be described later with reference to FIG. 12. According to another embodiment, a combination of the antenna structure 500 illustrated FIG. 4C and the antenna illustrated in FIG. 12 may be used as an antenna for the pen input device 120.

The pen input device 120 according to various embodiments of the disclosure may include a structure 600 (hereinafter, referred to as "support member"). According to one embodiment, the support member 600 may be disposed in the space between the pen housing 400 and the printed circuit board 432. Further, according to one embodiment, the support member 600 may come into contact with a part (e.g., a conductive pad) of the antenna structure 500. The above-mentioned antenna and the support member 600 will be described in detail with reference to FIGS. 6, 7A, 7B, and 12.

According to various embodiments, the ejection member 410, described with reference to FIGS. 4B and 4C, may be a click-mechanism generation means. When a user pushes the button part 413, a "click" by a push-pull operation may be generated, and thus the user can take the pen input device 120 out of the electronic device 100 in the state in which the pen input device 120 is inserted into the electronic device 100, and may use the pen input device 120 as a means to change an input mode (or perform a pop-up function) in the state in which the electronic device 100 is detached from the pen input device 120. According to one embodiment, when taking the pen input device 120 out of the electronic device 100, the user may easily remove the pen input device 120 inserted in the receiving space 122, by using the repulsive force of a spring included in the ejection member 410.

The coil part 420, illustrated in FIGS. 4B and 4C, may be a means to generate a pen input signal. According to various embodiments, the pen tip 421 may generate a pen coordinate signal in the form of a magnetic field, and may generate a specific resonance frequency signal based on the size of a coil and the number of turns of the coil. According to various embodiments, the pen-pressure-sensing part 424 may include a tuning capacitor for changing capacitance in response to pen pressure, and thus may change a resonance frequency. According to one embodiment, when a resonance frequency is changed by the tuning capacitor included in pen-pressure-sensing part 424, pen input (e.g., the thickness of a pen) may be changed depending on sensing the changed resonance frequency through a digitizer.

The circuit board part 430 illustrated in FIGS. 4B and 4C may include various electronic components and circuits. According to one embodiment, the circuit board part 430 may be electrically connected to the coil part 420, and according to another embodiment, the circuit board part 430 may be electrically connected to the ejection member 410, in addition to being electrically connected to the coil part 420.

Hereinafter, the assembly sequence of the pen input device 120 of the disclosure will be described with reference to FIGS. 5A to 5I.

Figure 5A:
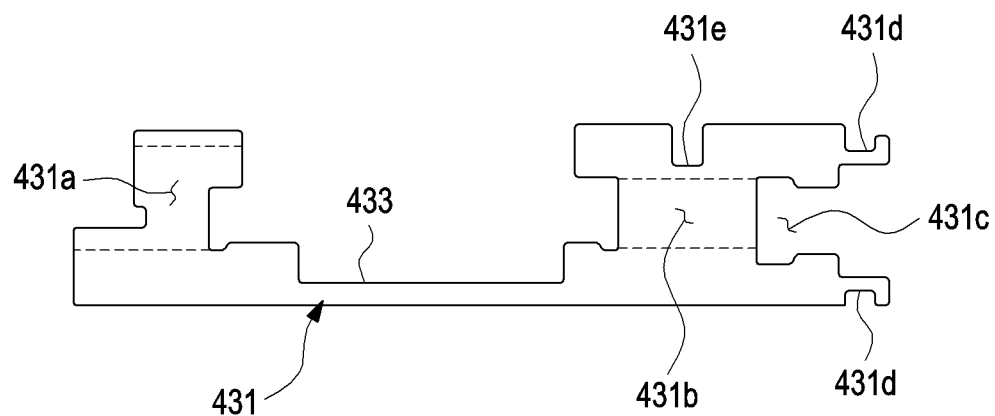
FIG. 5A illustrates a base of a pen input device according to various embodiments.

FIG. 5A illustrates the base 431 of the pen input device 120 according to various embodiments.

According to various embodiments, the base 431 is an essential structure configured to combining a coil part (e.g., reference numeral 420 in FIG. 4B), a circuit board part (e.g., reference numeral 430 in FIG. 4B), and an ejection member (e.g., reference numeral 410 in FIG. 4B) into one assembly. According to one embodiment, the base 431 may be made of a synthetic resin material. According to one embodiment, the substrate-seating part 433 may be formed on one surface of the base 431 (e.g., the top surface) so as to allow the circuit board part to be seated thereon, and the base 431 may have a front fastening region 431a and a rear fastening region 431*b* to which the coil part and the ejection member can be fastened, respectively. According to one embodiment, at least one of the front fastening region 431*a* or the rear fastening region 431*b* may have the shape of an insert through-hole. Further, according to one embodiment, the base 431 may have the shape of a type of tube. In addition to or as an alternative to the above-described embodiments, the base 431 may have a recess 431*c*, and may have at least one fastening part 431*d* and 431*e*.

Figure 5B:
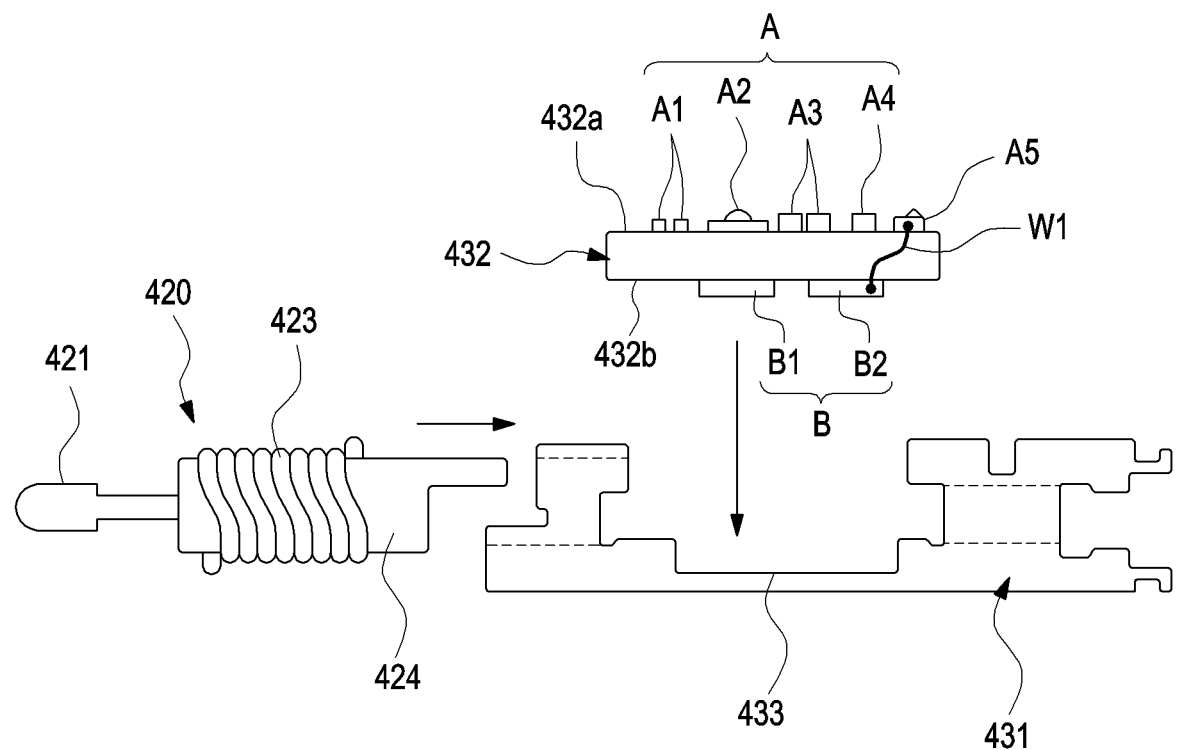
FIG. 5B illustrates assembling a coil part and a printed circuit board to a base according to various embodiments.
Figure 5C:
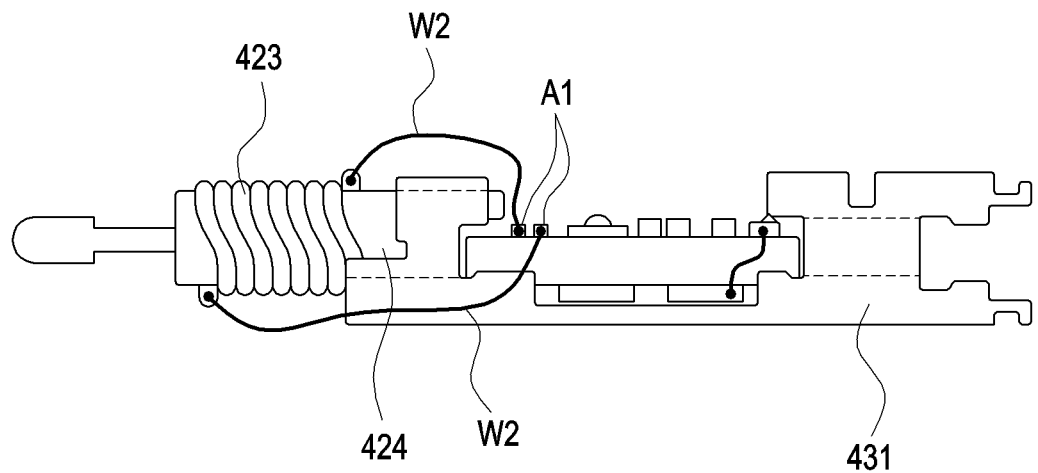
FIG. 5C illustrates a state in which wires are provided in the state in which a coil part and a printed circuit board are assembled to a base according to various embodiments.

FIG. 5B illustrates assembling the coil part 420 and the printed circuit board 432 to the base 431 according to various embodiments. FIG. 5C illustrates a state in which wires are provided in the state in which the coil part 420 and the printed circuit board 432 have been assembled to the base 431 according to various embodiments.

According to various embodiments, the coil part 420 may be inserted into the front fastening region 431*a*. In the above-described embodiment, the insert hole is not necessarily limited to a structure in which the entire circumference thereof is closed, and may be at least partially open to the outside, for example, may have the shape of an opening that is open at the top thereof. Therefore, the printed circuit board 432 as well as various electronic components and circuit mechanisms may be seated on the substrate-seating part 433 or in region around the fastening regions 431*a* and 431*b* that include the substrate-seating part 433. According to various embodiments, various electronic components and circuit components may be mounted on the printed circuit board 432. The printed circuit board 432 may have a first surface 432*a* and a second surface 432*b* facing a direction opposite to that faced by the first surface 432*a*, and various electronic components and circuit components A and B may be provided on the first surface 432*a* and the second surface 432*b*, respectively.

For example, components A1, A2, A3, A4, and A5 mounted on the first surface 432*a* may be components constituting a tuning capacitor array. Herein, the tuning capacitor array may be an element for monitoring changes in a resonance frequency used for data communication between a pen input device and an electronic device and controlling at least one element of the pen input device such that the resonance frequency can maintain a designated range. According to one embodiment, at least one component A1 of the components A1, A2, A3, A4, and A5 mounted on the first surface 432*a* may correspond to a positive (+) or negative (−) electrode, another component A2 may correspond to a switch (e.g., reference numeral 434 in FIG. 4B), and another component A5 may correspond to an antenna connector (e.g., C-Clip). In addition, components mounted on the first surface 432*a* may correspond to various components constituting a tuning capacitor array. One component B2 of components B1 and B2 mounted on the second surface 432*b* may correspond to a communication circuit (e.g., a Bluetooth low energy (BLE) circuit). According to one embodiment, the antenna connector A5 and the communication circuit B2 may be electrically connected to each other through a wire W1.

According to various embodiments, when the coil part 420 is fastened to the base 431, an electrode (e.g., A1) of the base is electrically connected to the coil part 420 by the wire W2. Thus, according to one embodiment, the coil part 420, the switch 434, and the tuning capacitor array may be electrically connected to each other. At this time, a coil (e.g., reference numeral 423 in FIG. 4C) of the coil part 420 may generate a resonance frequency by the switch 434 and the tuning capacitor array.

Figure 5D:
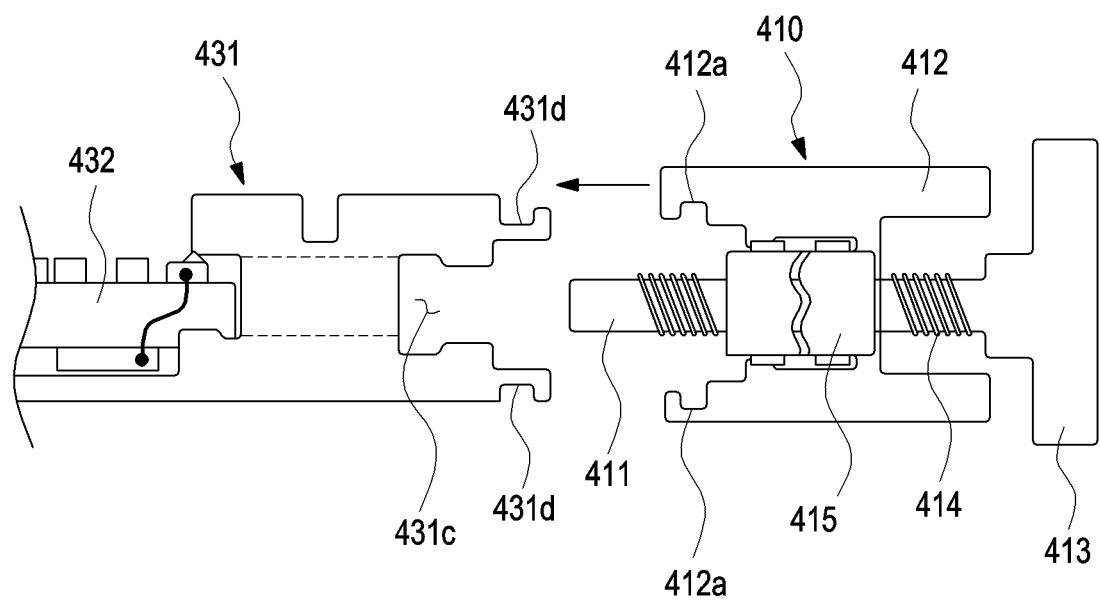
FIG. 5D illustrates assembling an ejection member to a base according to various embodiments.
Figure 5E:
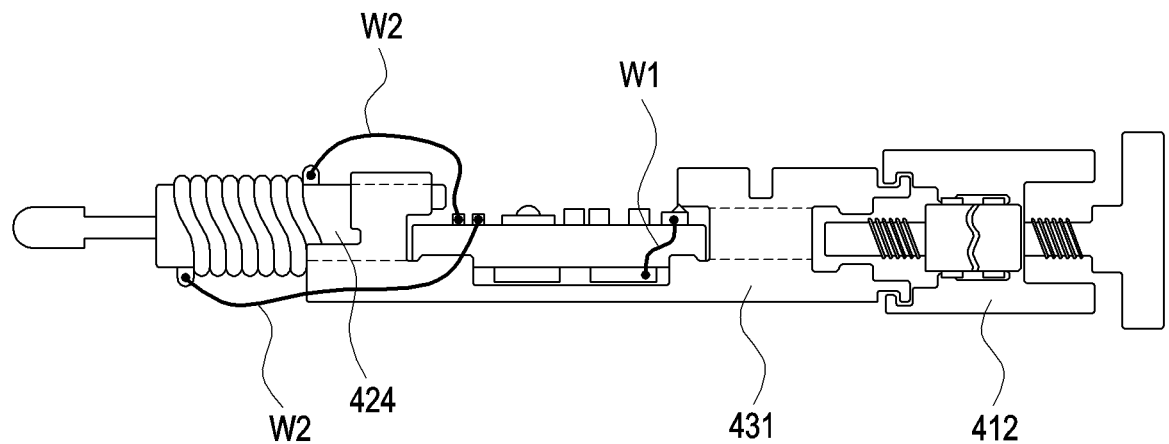
FIG. 5E illustrates a state in which a coil part, a printed circuit board, and an ejection member are assembled to a base according to various embodiments.

FIG. 5D illustrates assembling the ejection member 410 to the base 431 according to various embodiments. FIG. 5E illustrates a state in which the coil part 420, the printed circuit board 432, and the ejection member 410 are assembled to the base 431 according to various embodiments.

According to various embodiments, a battery part (e.g., the battery-seating part 435 in FIG. 4C) may be disposed in the rear fastening region 431*b* illustrated in FIG. 5A, and the shaft 411 of the ejection member 410 may be disposed in the recess 431*c* adjacent to the rear fastening region 431*b*. According to one embodiment, the recess 431*c* may be a space provided such that the shaft 411 can move forwards and backwards during implementation of a click mechanism of the ejection member 410 even when the ejection member 410 is fastened to the base 431.

According to various embodiments, the ejection member 410 may include a cam structure 415 and a spring 414, wound around the outer circumferential surface of the shaft 411, in order to implement the click mechanism. The cam structure 415 may be formed of at least two cams which are engaged with each other. For example, when the cam structure 415 is formed of two cams engaged with each other, as in the example illustrated in FIG. 5D, the cam structure 415 may include an upper cam and a lower cam along the lengthwise direction of the shaft 411. According to various embodiments, in the process of fastening the ejection member 410 to the rear fastening region 431*b*, fastening mechanisms 412*a* formed at the ejection member 410 may be coupled to fastening parts 431*d* formed at the base 431.

Figure 5F:
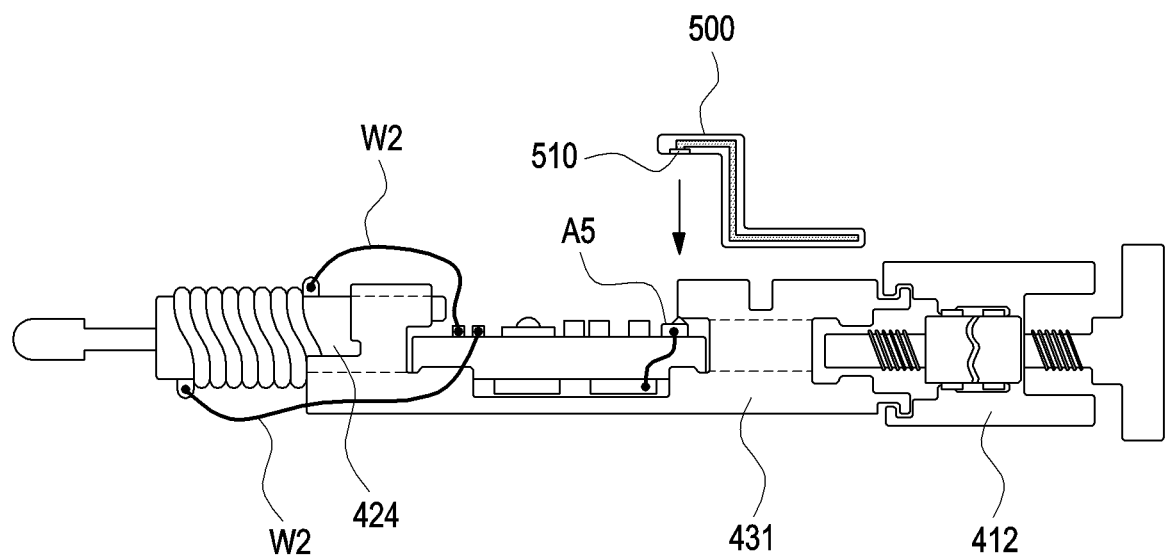
FIG. 5F illustrates assembling an antenna structure to a base according to various embodiments.
Figure 5G:
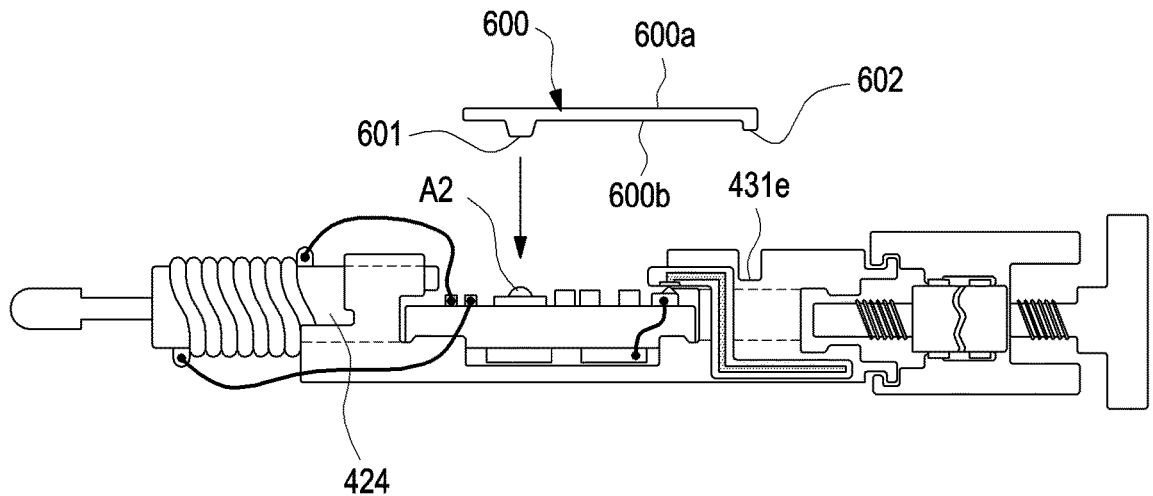
FIG. 5G illustrates assembling a structure (or a support member) to a base according to various embodiments.

FIG. 5F illustrates assembling the antenna structure 500 to the base 431 according to various embodiments. FIG. 5G illustrates assembling a structure (or the support member 600) to the base 431 according to various embodiments.

The pen input device 120 according to various embodiments of the disclosure may include the antenna structure 500 electrically connected to a wireless communication circuit (e.g., B2 in FIG. 5B) positioned in an inner space 401. According to one embodiment, the antenna structure 500 may be disposed on a top surface portion of the inner assembly such that at least a portion thereof is connected to an antenna connector (e.g., A5 in FIG. 5B) positioned on the printed circuit board 432. Further, in order to efficiently use the inner space 401 of the pen input device 120, the antenna structure 500 may be formed such that at least a part thereof faces a side portion of the inner assembly. That is, the antenna structure 500 according to one embodiment may have a shape facing each of the top surface and the side portion of the inner assembly.

According to various embodiments, a conductive pad 510 for electrical connection to an antenna connector (e.g., A5 in FIG. 5B) may be provided on one surface of the antenna structure 500, for example, on the bottom surface of the antenna structure 500. According to one embodiment, the antenna structure 500 may be assembled to the circuit board part 430 in the state in which the conductive pad 510 is aligned with the antenna connector (e.g., A5 FIG. 5B) so as to come into contact with the antenna connector.

According to various embodiments, in the state in which the antenna structure 500 has been assembled to the base 431, as illustrated in FIG. 5G, the support member 600 may be additionally assembled thereto. The support member 600 may have a top surface 600*a* and a bottom surface 600*b* facing a direction opposite to that faced by the top surface 600*a*, and may be assembled to the base 431 in the state in which the bottom surface 600*b* is aligned so as to come into contact with the antenna structure 500. The durability of the assembly structure may be secured by tightly coupling a fastening structure 602 formed at the support member 600 to the fastening part 431e formed in the base 431.

According to one embodiment, the support member 600 may be shaped to be elongated along the lengthwise direction of the inner assembly so as to cover an open space (e.g., the open substrate-seating part 433) formed on the top surface of the base 431 according to one embodiment. Thus, it is possible to protect a printed circuit board (e.g., reference numeral 432 in FIG. 5B) and various types of electronic components and circuit components, which are disposed in the open space. Further, according to one embodiment, the support member 600 may play the role of supporting a side button (e.g., reference numeral 437 in FIG. 4C).

Figure 5H:
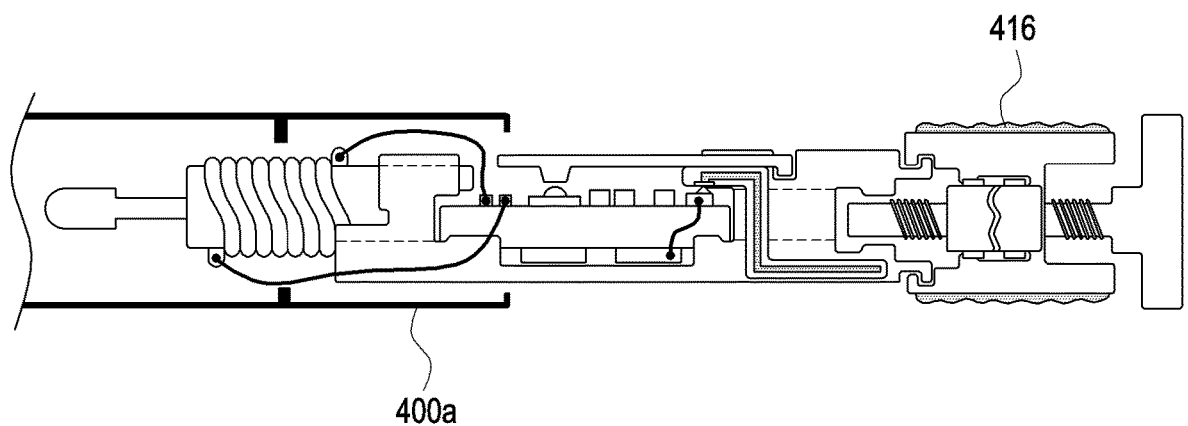
FIG. 5H illustrates coupling an inner assembly to a pen housing according to various embodiments.
Figure 5I:
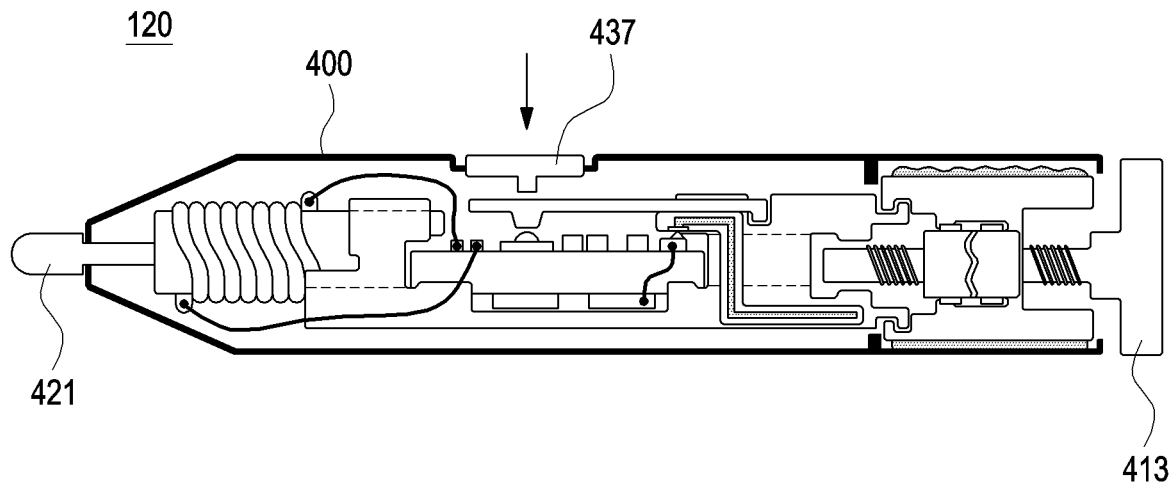
FIG. 5I illustrates assembling a side button to a pen input device according to various embodiments.

FIG. 5H illustrates coupling the inner assembly to the pen housing 400 according to various embodiments. FIG. 5I illustrates assembling the side button 437 to the pen input device 120 according to various embodiments.

When an inner assembly is obtained through the assembly process described with reference to FIGS. 5A to 5G, the inner assembly may be inserted into the pen housing 400 through a bonding process, as illustrated in FIG. 5H. According to one embodiment, the inner assembly may be inserted into the pen housing 400 in the state in which an adhesive 416 used for bonding is applied onto the outer circumferential surface of the ejection body 412. According to one embodiment, in the inner assembly, the ejection body 412 may be formed to have a width (height) larger than that of another element (e.g., the circuit board part 430). According thereto, the length by which the inner assembly is inserted into the pen housing 400 may be appropriately restricted. When the inner assembly is fitted in the pen housing 400 according to one embodiment, the durability of the final assembled pen input device may be secure, and foreign-matter-infiltration-preventive and waterproof functions may be also imparted thereto.

Figure 6:
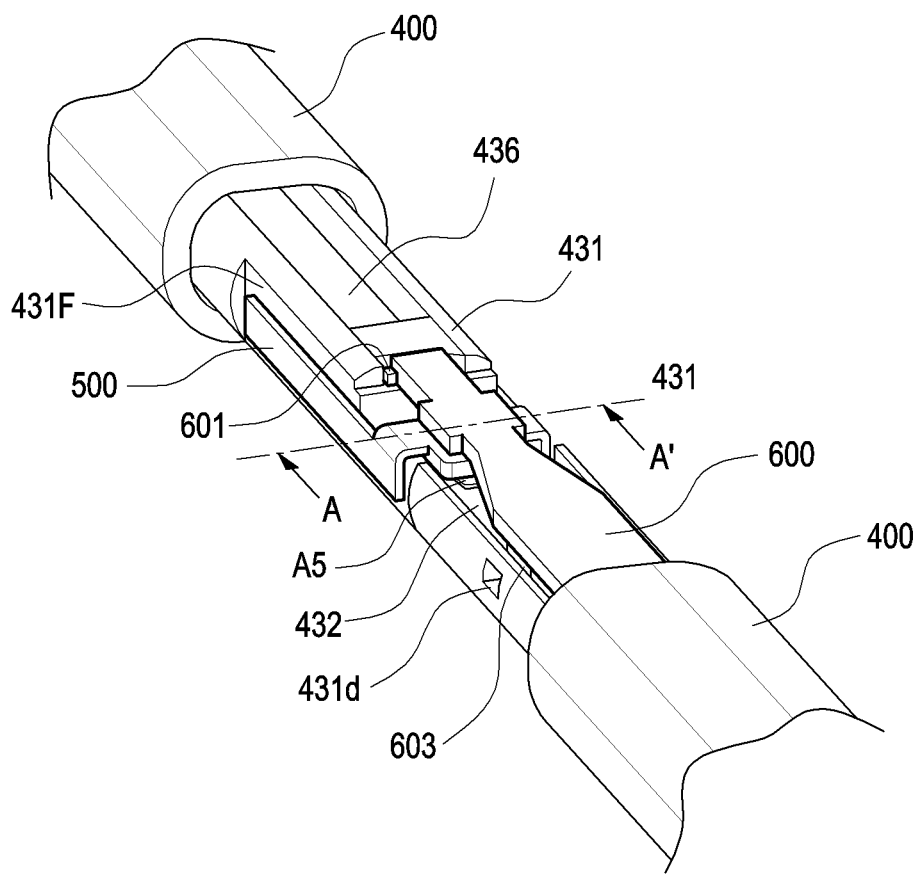
FIG. 6 is a perspective view illustrating the inside of a pen input device according to various embodiments.

FIG. 6 is a perspective view illustrating the inside of a pen input device (e.g., reference numeral 120 in FIG. 4A) according to various embodiments.

According to various embodiments, the inner assembly may be compactly assembled in the inner space (e.g., reference numeral 401 in FIG. 4C) of the pen housing 400.

The pen input device (e.g., reference numeral 120 in FIG. 4A) of the disclosure may be an element including a communication module for actively transmitting/receiving signals to/from an electronic device (e.g., reference numeral 100 in FIG. 1), rather than an element simply for performing pen input by pressing an electronic device having a display. According to various embodiments of the disclosure, in order to use the limited inner space (e.g., reference numeral 401 in FIG. 4C) of the pen housing 400, electronic components and circuit components may be mounted on each of the first surface 432a and the second surface 432b of the printed circuit board 432. Further, because a printed circuit board assembly has a predetermined height, an antenna structure 500 having a three-dimensional shape instead of a simple two-dimensional shape may be provided.

According to various embodiments, when seen from above the printed circuit board 432, the antenna structure 500 may have a U-shape overall.

Further, according to various embodiments, the antenna structure 500 may be a flexible antenna.

Figure 7A:
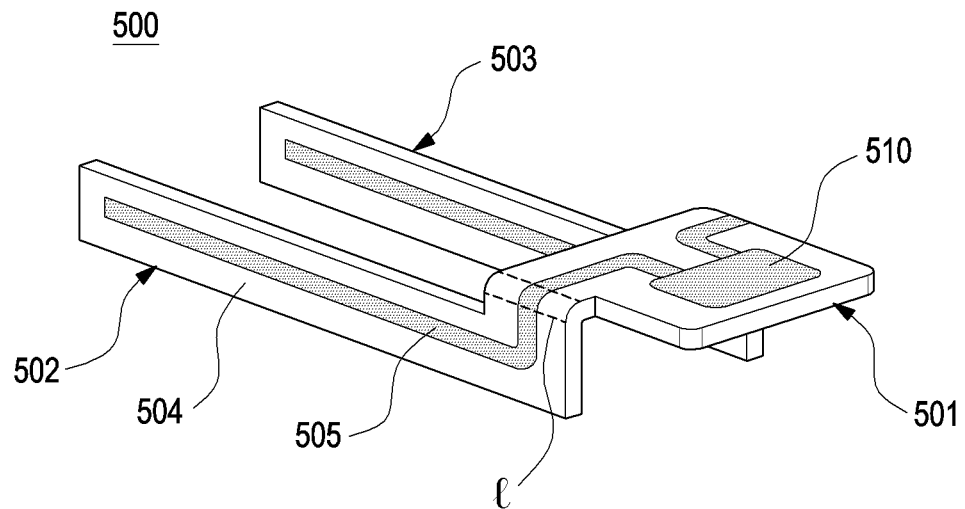
FIG. 7A is a perspective view of the top surface of an antenna structure according to various embodiments.
Figure 7B:
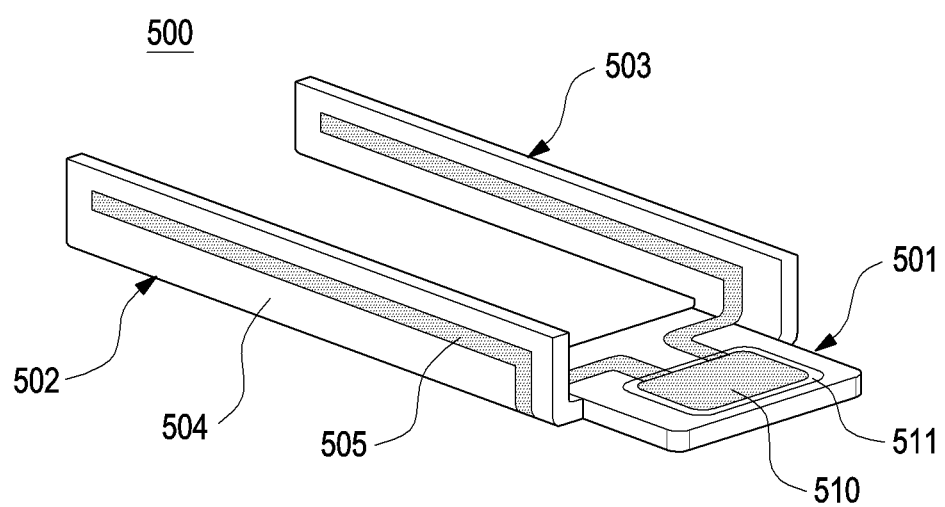
FIG. 7B is a perspective view of the bottom surface of an antenna structure according to various embodiments.

FIG. 7A is a perspective view of the top surface of the antenna structure 500 according to various embodiments. FIG. 7B is a perspective view of the bottom surface of the antenna structure 500 according to various embodiments.

The antenna structure 500 according to various embodiments of the disclosure may include a first conductive portion 501 positioned between a pen housing (e.g., reference numeral 400 in FIG. 4C) and a first surface (e.g., reference numeral 432a in FIG. 5B) of a printed circuit board (e.g., reference numeral 432 in FIG. 4C). If a first surface (e.g., reference numeral 432a in FIG. 5B) of the printed circuit board (e.g., reference numeral 432 in FIG. 4C) faces a first direction and a second surface (e.g., reference numeral 432b in FIG. 5B) of the printed circuit board (e.g., reference numeral 432 in FIG. 4C) faces a second direction opposite to the first direction, the first conductive portion 501 may have a top surface facing a direction parallel to the first direction and a bottom surface facing a direction parallel to the second direction. According to one embodiment, the conductive pad 510 for electrical connection to an antenna connector (e.g., A5 in FIG. 5B) may be formed on the first conductive portion 501. The bottom surface of the conductive pad 510 may be formed to come into contact with an antenna connector (e.g., A5 in FIG. 5F). Further, according to one embodiment, an insulation region 511 may be formed around the conductive pad 510 so as to prevent an electrical short from being caused by improper assembly of the inner assembly. According to one embodiment, the insulation region 511 may be obtained by removing one portion of a coverlay constituting the antenna structure 500.

The antenna structure 500 according to various embodiments of the disclosure may include: a second conductive portion 502, which is electrically connected to the first conductive portion 501 in a third direction, different from the first direction and the second direction, and extends along the printed circuit board (e.g., reference numeral 432 in FIG. 4C); and a third conductive portion 503, which is electrically connected to the first conductive portion 501 in a fourth direction, different from the first direction, the second direction, and the third direction, and extends along the printed circuit board (e.g., reference numeral 432 in FIG. 4C).

According to various embodiments, when the first surface (e.g., reference numeral 432a in FIG. 5B) of the printed circuit board (e.g., reference numeral 432 in FIG. 4C) is seen from above, the printed circuit board (e.g., reference numeral 432 in FIG. 4C) may be at least partially disposed between the second conductive portion 502 and the third conductive portion 503.

Referring to FIGS. 7A and 7B together, with reference to the first conductive portion 501, the second conductive portion 502 and the third conductive portion 503 may be disposed at one side and another side, opposite to the one side, of the first conductive portion 501, and may be integrally connected to the first conductive portion 501. Each of the second conductive portion 502 and the third conductive portion 503 may be bent from the first conductive portion 501 along a bending line (l) (or a bending region). The second conductive portion 502 and the third conductive portion 503 are illustrated as being symmetrical to the first conductive portion 501, but are not necessarily limited thereto and modification is possible according to an embodiment. Further, the second conductive portion 502 and the third conductive portion 503 are illustrated as being perpendicularly bent from the first conductive portion 501, but are not limited thereto either, and modification is possible according to the shape of the inner assembly of a pen input device (e.g., reference numeral 120 in FIG. 4A). For example, if a side portion 431f of the base 431 is inclined, unlike the example illustrated in FIG. 6, the third direction and the fourth direction, which the second conductive portion 502 and the third conductive portion 503 face, may not be perpendicular to the first direction. Further, the third direction and the fourth direction may not be parallel to each other.

According to various embodiments, the antenna structure 500 may include: a portion forming the entire exterior thereof and a conductive pattern portion capable of radiating a communication signal. According to one embodiment, unlike the conductive pattern portion, the portion forming the entire exterior of the antenna structure 500 may be formed of a dielectric. Referring to FIG. 7A, each of the first conductive portion 501, the second conductive portion 502, and the third conductive portion 503 may include: a dielectric portion 504 formed of a dielectric; and a conductive pattern portion 505. Unlike the example illustrated in the drawings, the conductive pattern portion 505 may have areas having various sizes, and may have a shape (e.g., zigzag) that is different from the pattern shape (straight line) illustrated in the drawings.

Figure 8:
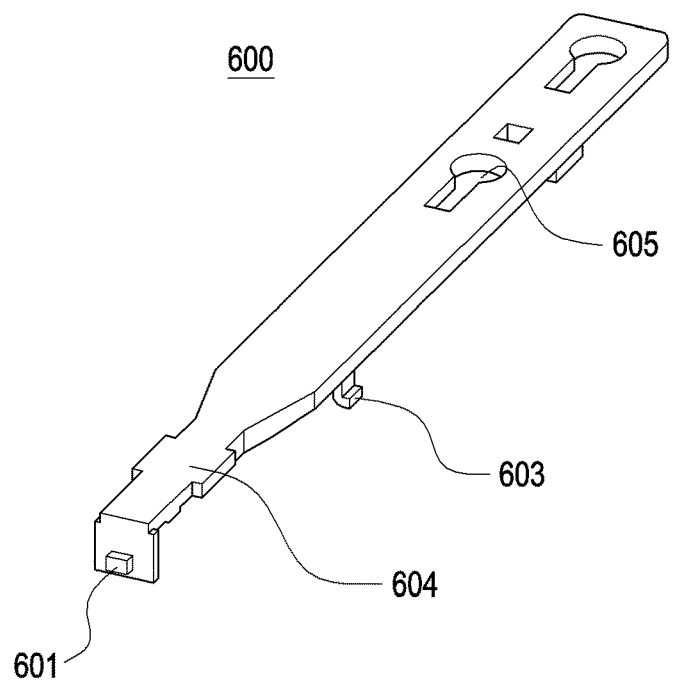
FIG. 8 is a perspective view of the top surface of a structure (or a support member) according to various embodiments.
Figure 9:
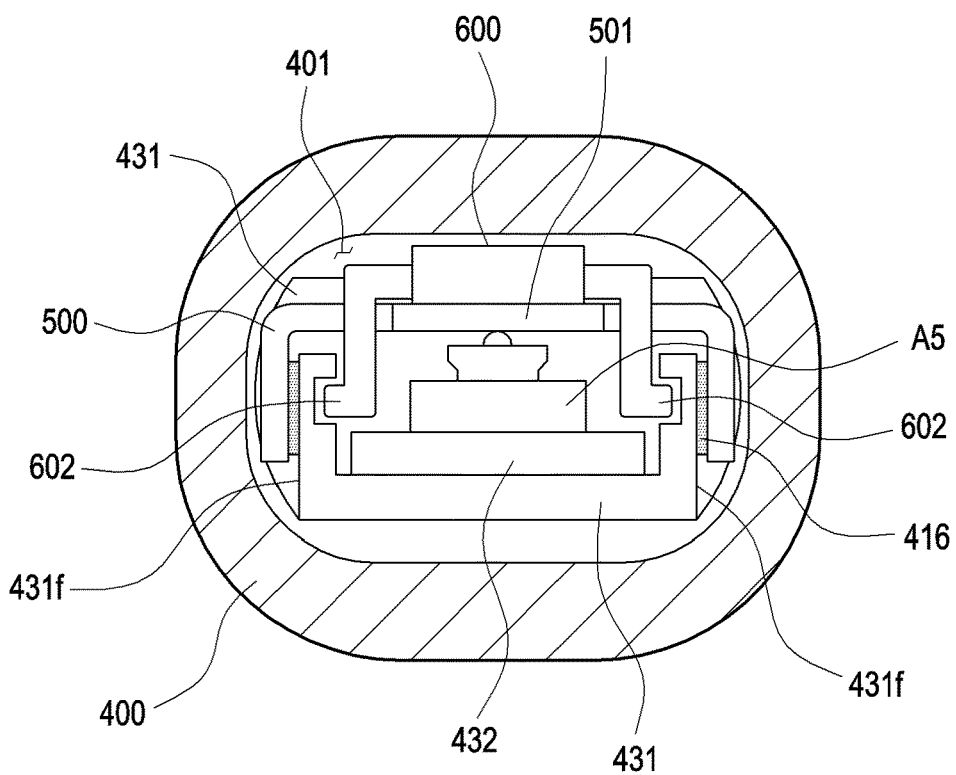
FIG. 9 is a cross-sectional view of a pen input device according to various embodiments.

FIG. 8 is a perspective view of the top surface of a structure (or the support member 600) according to various embodiments. FIG. 9 is a cross-sectional view of the pen input device 120 (e.g., reference numeral 120 in FIG. 4A) according to various embodiments.

According to various embodiments, a pen input device (e.g., reference numeral 120 in FIG. 4A) capable of actively transmitting/receiving a signal to/from an electronic device (e.g., reference numeral 100 in FIG. 1) may be configured merely by the above-described shape of the antenna structure 500 itself. However, the state of contact between an antenna and an antenna connector (e.g., A5 in FIG. 5B) may not be stably maintained during use of the pen input device 120. According to various embodiments of the disclosure, the problem may be prevented by providing a structure (hereinafter, referred to as a "support member 600") in an inner space (e.g., reference numeral 401 in FIG. 4B) of a pen input device (e.g., reference numeral 120 in FIG. 4A).

Referring to FIG. 8, at least one fastening structure (e.g., hooks 601 and 603) may be formed on the support member 600, and at least one of the fastening structures 601 and 603 of the support member 600 may be fastened to the fastening part (e.g., reference numeral 431*d* or 4313*e* in FIG. 5A) formed at the base 431 so that a stable fixing structure is achieved. Thereby, it is possible to maintain contact force between an antenna structure (e.g., reference numeral 500 in FIG. 4C) and an antenna connector (e.g., A5 in FIG. 5B).

According to various embodiments, as described above, in a structure in which the top surface of the base 431 is open, the support member 600 may play the role of protecting the printed circuit board 432 or various electronic components, mounted on the base 431. A portion of the bottom surface (e.g., reference numeral 600*b* in FIG. 5G) of the support member 600 may be opposite to a portion (e.g., reference numeral 510 in FIG. 7A) of the antenna structure 500. For example, a contact part 604 illustrated in FIG. 8 may be a region that is opposite to a portion (e.g., reference numeral 510 in FIG. 7A) of the antenna structure 500. When the support member 600 supports a side button (e.g., reference numeral 437 in FIG. 4C), the side button (e.g., reference numeral 437 in FIG. 4C) may be at least partially inserted into the hole structure 605 illustrated in FIG. 8.

Referring to FIGS. 8 and 9, the support member 600 according to various embodiments may be positioned in an inner space (e.g., reference numeral 401 in FIG. 4B) between a first conductive portion (e.g., reference numeral 501 in FIG. 7A) and a pen housing (e.g., reference numeral 400 in FIG. 4B). According to one embodiment, the support member 600 may come into physical contact with the first conductive portion 501. The support member 600 is formed of a dielectric, and thus may prevent an electrical short circuit when coming into contact with the first conductive portion 501.

According to various embodiments, the support member 600 may or may not come into direct contact with a pen housing (e.g., reference numeral 400 in FIG. 4B). According to various embodiments, the support member 600 may play the role of supporting a side button (e.g., reference numeral 437 in FIG. 4C). According to one embodiment, when the support member 600 does not come into direct contact with the pen housing (e.g., reference numeral 400 in FIG. 4B), the support member 600 may be indirectly supported by the pen housing (e.g., reference numeral 400 in FIG. 4B) via the side button 437, thereby implementing an operation of pressing the first conductive portion 501.

According to various embodiments, base side portions 431*f* may form two different surfaces of the base 431, and may be surfaces to which the second conductive portion 502 and the third conductive portion 503 of the antenna structure 500 are attached, respectively. The base 431 according to various embodiments of the disclosure may be included in a pen input device (e.g., reference numeral 120 in FIG. 4A), the cross section of which has the shape of an ellipse having a major axis and a minor axis. The two base side portions 431*f* may be surfaces forming the outermost surfaces of the base 431, and may be disposed at different positions along the lengthwise direction of the major axis. Because the two base side portions 431*f* are formed along the lengthwise direction of the major axis, it may be easy to efficiently use the inner space of the pen housing 400, compared with the case in which the two base side portions 431*f* are disposed in the lengthwise direction of the minor axis. When the two base side portions 431*f* are formed in the lengthwise direction of the major axis and the second conductive portion 502 and the third conductive portion 503 are attached thereto, electromagnetic interference between an antenna and the other electronic components disposed in the pen housing 400 may be reduced. That is, a pen input device (e.g., reference numeral 120 in FIG. 4A) according to various embodiments of the disclosure may have radiation efficiency that is enhanced comparted to that obtained simply by printing and applying an antenna onto a printed circuit board, and may secure the antenna performance which the pen input device is required to have.

Figure 10:
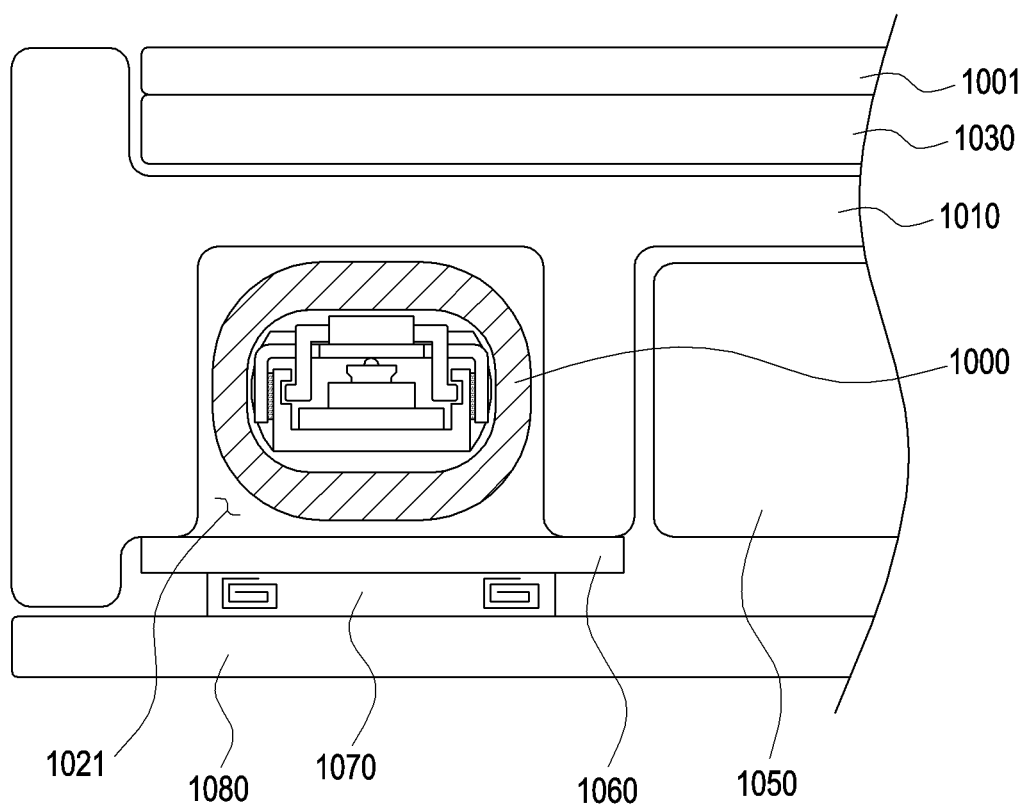
FIG. 10 is a cross-sectional view of an electronic device according to various embodiments.

FIG. 10 is a cross-sectional view of an electronic device (e.g., reference numeral 100 in FIG. 1) according to various embodiments.

Referring to FIG. 10, the electronic device (e.g., reference numeral 100 in FIG. 1) may include: a terminal housing 1010 surrounding a receiving space 1021 (e.g., reference numeral 122 in FIG. 4A) of the electronic device 100; a front plate 1001 (e.g., reference numeral 102 in FIG. 1) disposed at one surface of the terminal housing 1010; a display 1030 (e.g., reference numeral 101 in FIG. 1); a rear plate 1080 (e.g., reference numeral 111 in FIG. 2) disposed at a surface opposite to the front plate 1001; and a terminal battery 1050 disposed between the front plate 1001 and the rear plate 1080. According to one embodiment, the material of the terminal housing 1010 (e.g., reference numeral 110 in FIG. 4A) may include metal (e.g., aluminum). According to one embodiment, in the terminal housing 1010 of the electronic device (e.g., reference numeral 100 in FIG. 1), only a terminal housing 1060 disposed in a region adjoining a portion at which a wireless charging coil 1070 provided to charge a battery (e.g., reference numeral 436 in FIG. 4C) is disposed may be formed of a synthetic resin material (e.g., a plastic cover). Therefore, in the state in which a pen input device (e.g., reference numeral 120 in FIG. 4A) is inserted into the receiving space 1021, an antenna radiation beam for communication with an external electronic device may be generated through the terminal housing 1060 disposed in the region that adjoins the portion at which the wireless charging coil 1070 is disposed.

According to an embodiment, variation may occur in antenna radiation efficiency depending on a direction in which an antenna structure (e.g., reference numeral 500 in FIG. 4C) is inserted into a pen housing 1000 (e.g., reference numeral 400 in FIG. 4C). In consideration thereof, in a pen input device (e.g., reference numeral 120 in FIG. 4C) according to various embodiments of the disclosure, a conductive pattern of an antenna, having as large an area as possible, may be disposed in a direction parallel to the direction in which the antenna structure is inserted into the pen housing 1000 and in which antenna performance variation is the smallest, that is, parallel to the lengthwise direction of the main axis of the cross section of the pen housing 1000.

According to various embodiments, when a portion of the pen housing 1000 that is adjacent to the antenna structure (e.g., reference numeral 500 in FIG. 4C) is formed of a metal material (e.g., aluminum), the length of a conductive pattern of the antenna structure (e.g., reference numeral 500 in FIG. 4C) may be changed in accordance with the material and composition of the pen housing 1000. When the pen housing 1000 and the antenna structure 500, including a metal material, are disposed adjacent to each other, a resonance frequency shifting phenomenon and antenna gain attenuation may occur due to coupling between the pen housing 1000 and the antenna. In order to prevent the resonance frequency shifting phenomenon and the antenna gain attenuation phenomenon, according to one embodiment, the conductive pattern may be formed to be longer than a conductive pattern when the pen housing 1000 is formed of a synthetic resin. According to another embodiment, the shape of the conductive pattern may also be changed.

Figure 11:
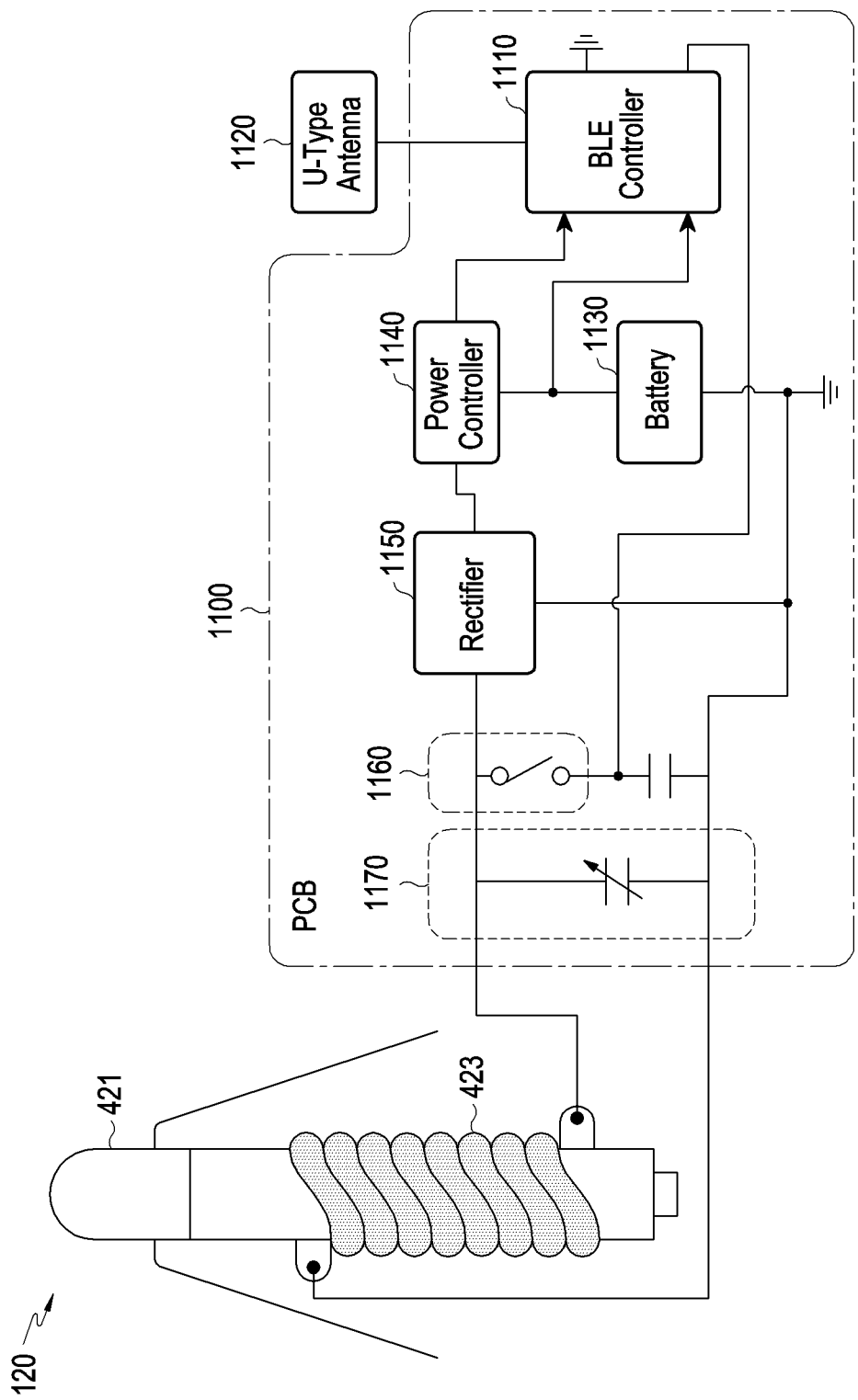
FIG. 11 is a view for describing the circuit configuration of a printed circuit board included in a pen input device according to various embodiments.

FIG. 11 is a view for describing the circuit configuration of a printed circuit board 1100 (e.g., reference numeral 432 in FIG. 4C) included in the pen input device 120 (e.g., reference numeral 120 in FIG. 4A) according to various embodiments.

Referring to FIG. 11, the printed circuit board 1100 may include a controller 1110, a battery 1130, a power controller 1140, a rectifier 1150, a button switch 1160, and/or a tuning capacitor circuit 1170.

Figure 15:
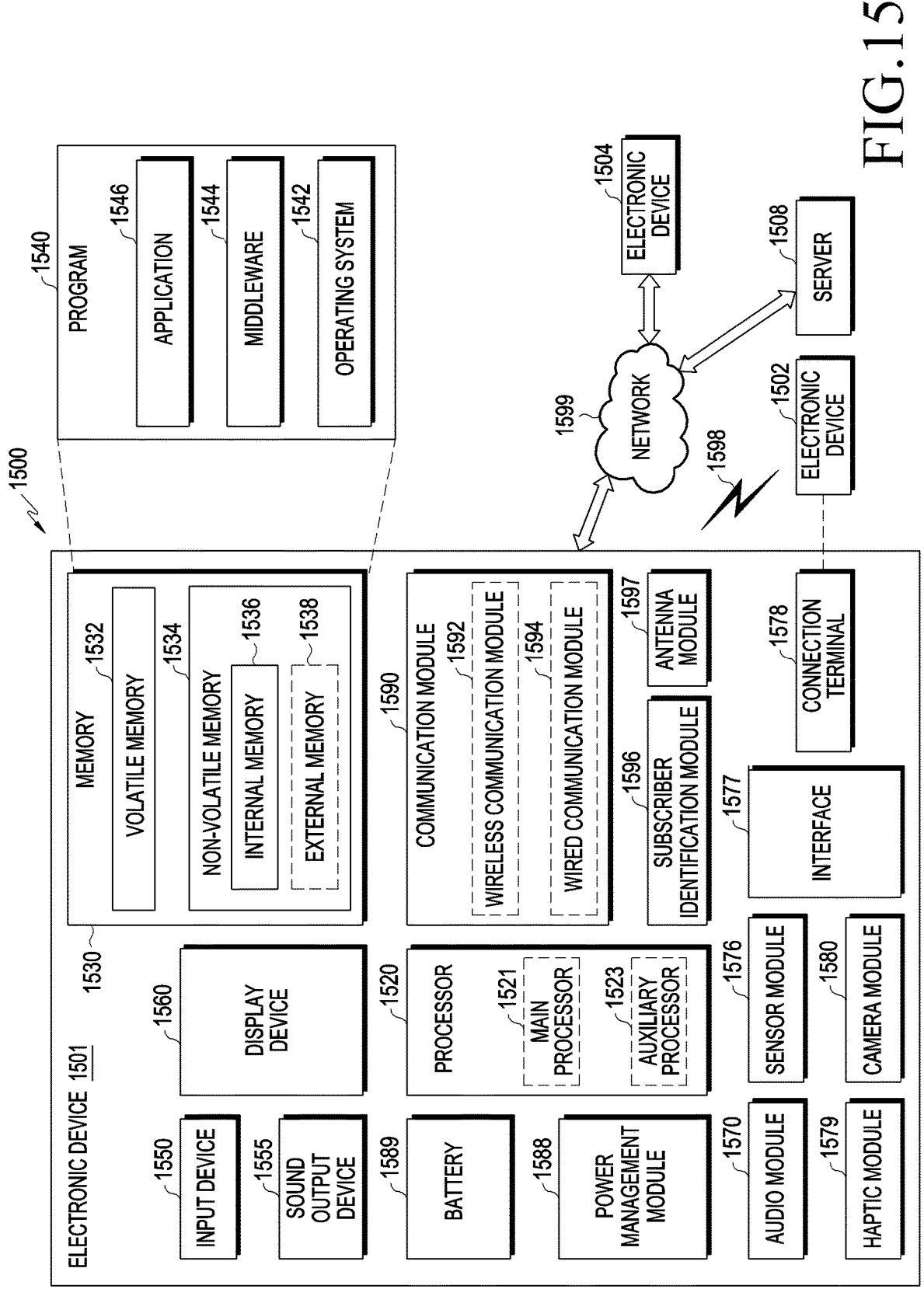
FIG. 15 is a block diagram of an electronic device in a network environment according to various embodiments.

According to various embodiments, the controller 1110 may include at least one processor (e.g., the processor 1520 in FIG. 15). The controller 1110 may include communication circuit controller, the controller 1110 may control elements included in the pen input device 120, or may monitor the state of each of the elements. The controller 1110 may include a signal generator capable of generating a signal according to a preconfigured frequency. Further, the controller 1110 may include a phase-determining unit capable of comparing a signal generated by the signal generator with a signal received from a reception circuit and detecting the difference between the two signals, based on the result of the comparison.

The battery 1130 (e.g., reference numeral 436 in FIG. 4C) according to various embodiments may supply power such that one or more elements included in a pen input device (e.g., reference numeral 120 in FIG. 4A) can actively operate. According to one embodiment, a power detector may be additionally provided to measure the voltage of the battery 1130 in real time and transfer the measurement result to the controller 1110.

The power controller 1140 according to various embodiments may perform: a function of determining whether to supply a charging current to the battery; and a switching function of performing or stopping (e.g. temporarily stopping) the supply of charging current). According to one embodiment, whether the pen input device (e.g., reference numeral 120 in FIG. 4A) is inserted into a pen housing (e.g., reference numeral 400 in FIG. 4B) may be identified by sensing a direct-current signal through the power controller 1140.

According to various embodiments, the rectifier 1150 may be connected to a coil part (e.g., an EMR coil) and may change the supplied alternating-current signal into a direct-current signal. The battery may be charged by changing an alternating-current signal into a direct-current signal.

According to various embodiments, the button switch 1160 may be used to change a pen input mode depending on input of a button part (e.g., the button part 413 in FIG. 4C or the side button 437 in FIG. 4C).

According to various embodiments, the tuning capacitor circuit 1170 is a circuit that can have capacitance changed according to a control of the controller 1110, and may include one or more capacitors, one or more transistors, one or more input/output ports, and a logical circuit.

According to various embodiments, when it is determined that a physical or chemical change occurs in at least one of a resonance circuit (not shown) and the coil 423, and thus a signal of a designated resonance frequency is not generated, the controller 1110 may control the tuning capacitor circuit 1170 to adjust the entire capacitance of the pen input device (e.g., reference numeral 120 in FIG. 4A), thereby generating the signal of the designated resonance frequency.

According to various embodiments, the controller 1110 (or the processor) may use data exchanged between the coil 423 and a detection coil (not shown) provided in an electronic device (e.g., reference numeral 100 in FIG. 4A) to determine whether the pen input device (e.g., reference numeral 120 in FIG. 4A) is completely inserted into a receiving space (e.g., reference numeral 122 in FIG. 4A) provided in the electronic device 100, or may identify the state of the battery 1130 (e.g., the battery part 436 in FIG. 4C) provided in the pen input device and then control elements such that the battery 1130 can be charged.

For example, the controller 1110 may determine the position of the pen input device, based on the data transmitted and received between the detection coil of the electronic device (e.g., reference numeral 100 in FIG. 4A) and the coil 423 of the pen input device (e.g., reference numeral 120 in FIG. 4A). According to one embodiment, transmission and reception of data between the detection coil of the electronic device (e.g., reference numeral 100 in FIG. 4A) and the coil 423 of the pen input device (e.g., reference numeral 120 in FIG. 4A) may be performed via an antenna 1120. For example, the antenna 1120 may correspond to the U-type antenna structure (e.g., reference numeral 500 in FIG. 4C) in the above-described embodiment. Further, when it is determined that the determined position of the pen input device is within a range within which the pen input device can be charged, the controller 1110 may identify the state of the battery 1130, and may charge the battery 1130 with power received from the outside via the coil 423. According to one embodiment, the controller 1110 may receive power that is received from the outside via the coil 423, and may control elements such that the received power is transferred to the battery 1130 via the power controller 1140. According to one embodiment, the controller 1110 (or the processor) may use the time point, at which the battery 1130 of the pen input device 120 is completely charged, as a condition for initiating at least one instruction.

The above-described various embodiments are merely presented to easily describe functions and roles of elements included in the electronic device (e.g., reference numeral 100 in FIG. 4A) and the pen input device 120 (e.g., reference numeral 120 in FIG. 4A). Thus, those skilled in the art will easily understand that the elements are not limited to the above-described embodiments.

Figure 12:
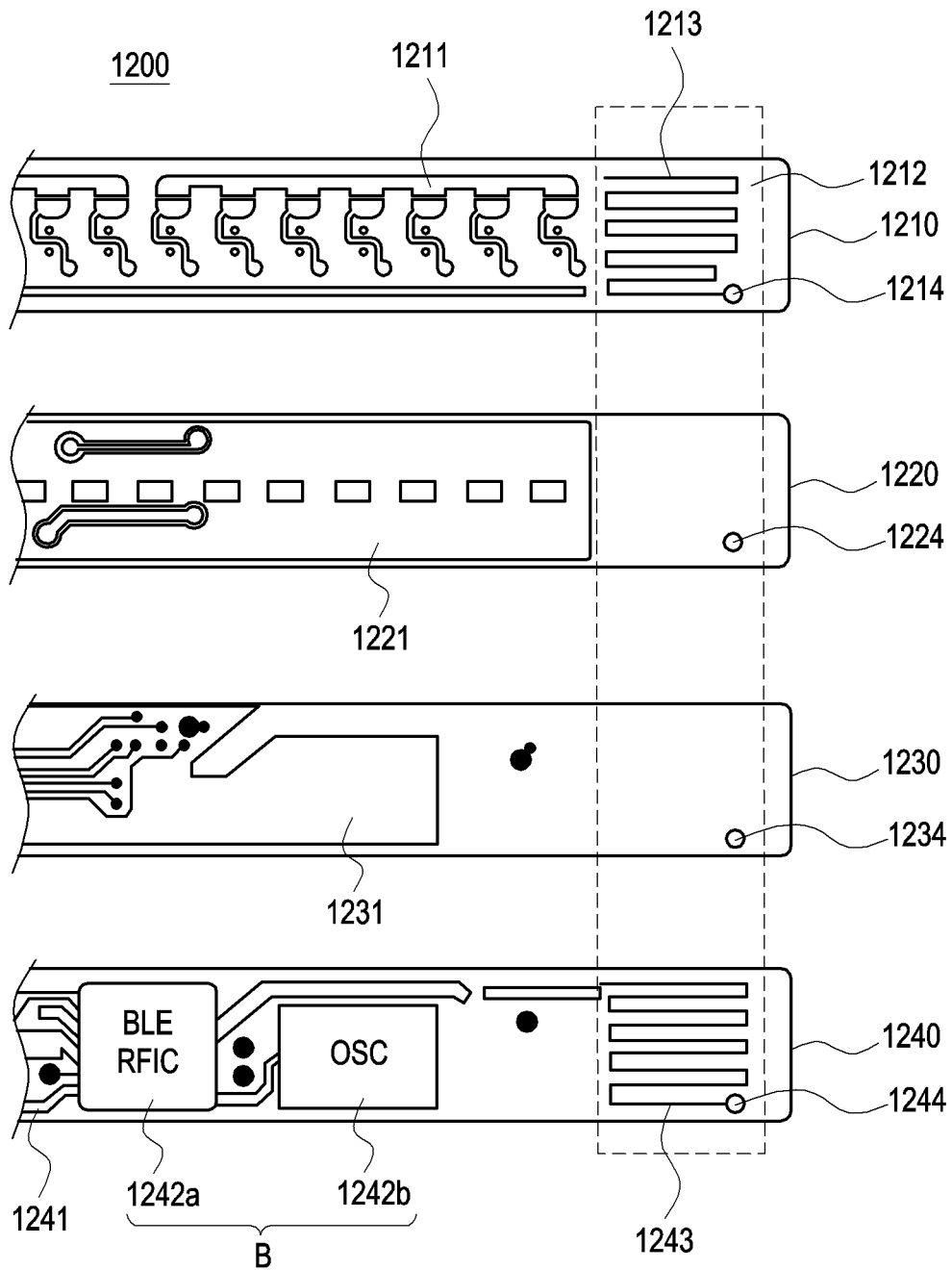
FIG. 12 is a diagram illustrating an antenna structure embedded in a printed circuit board according to various embodiments.
Figure 13:
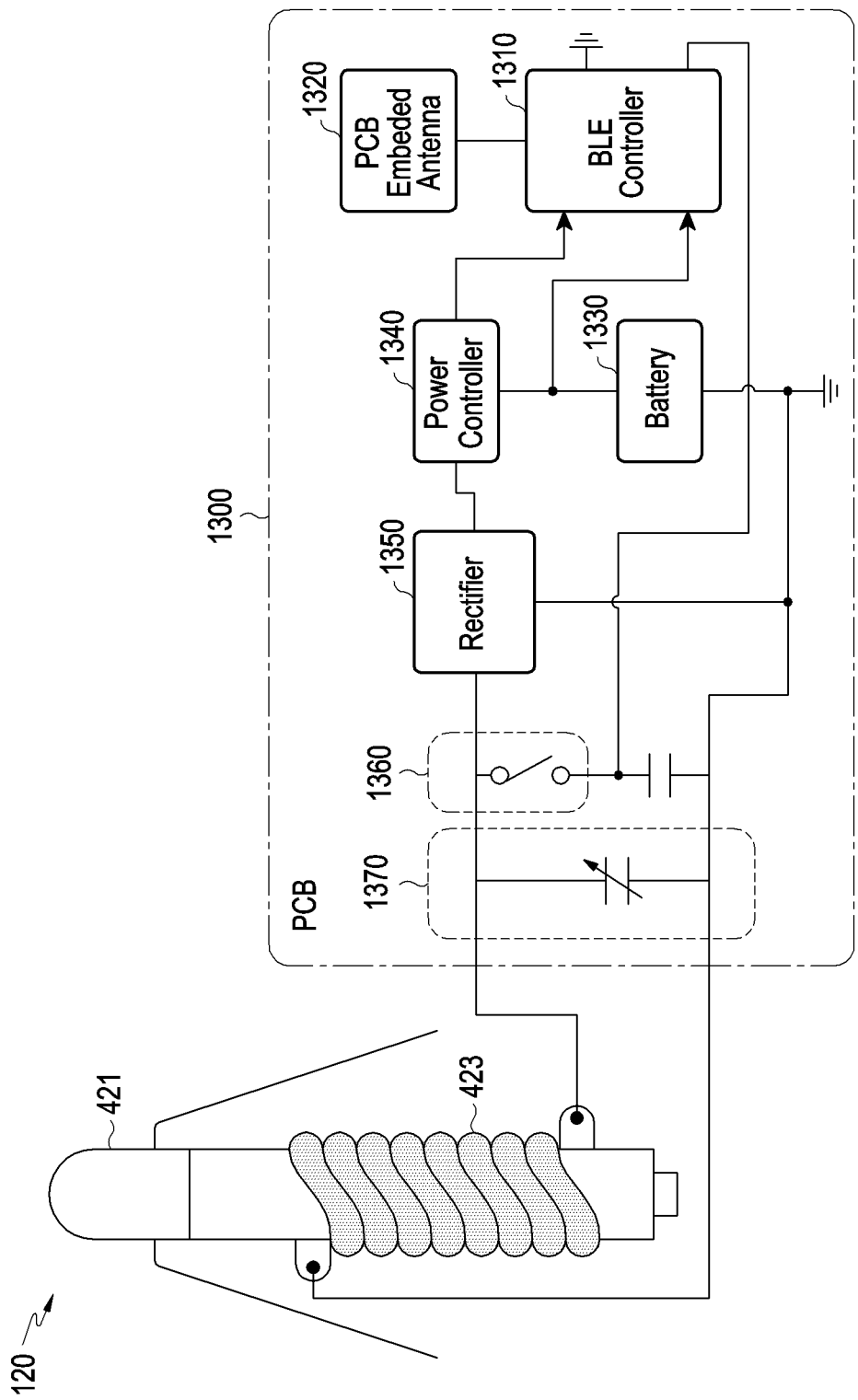
FIG. 13 is a view for describing the circuit configuration of a printed circuit board in which an antenna structure is embedded according to various embodiments.

FIG. 12 is a diagram illustrating an antenna structure embedded in a printed circuit board 1200 (e.g., reference numeral 432 in FIG. 4C) according to various embodiments. FIG. 13 is a view for describing the circuit configuration of a printed circuit board 1300 in which an antenna structure is embedded according to various embodiments.

According to various embodiments of the disclosure, the pen input device 120 may include an antenna provided by printing a pattern on the printed circuit board 1200 (PCB embedded antenna, hereinafter, referred as "PEA"), unlike an antenna structure (e.g., reference numeral 500 in FIG. 4C) which is an antenna provided as a separate element outside the printed circuit board 1200. According thereto, a pad electrically connected to the coil part 420 may be formed at one end (not shown) of the printed circuit board 1200, and a pattern-printed PEA may be formed at the other end of the printed circuit board 1200 so as to have a resonance frequency (e.g., 2.4 GHz).

As illustrated in FIG. 12, the printed circuit board 1200 according to various embodiments may include: a first surface (e.g., reference numeral 432a in FIG. 5B) facing a first direction; a second surface (e.g., reference numeral 432b in FIG. 5B) facing a direction opposite to the first direction; and multiple layers formed between the first surface and the second surface. FIG. 12 illustrate four layers 1210, 1220, 1230, and 1240 as an embodiment of the multiple layers, but the multiple layers are not limited thereto and may include two, three, or five or more layers.

The printed circuit board 1200 according to various embodiments may include a tuning capacitor circuit. Referring to FIG. 12, according to one embodiment, a tuning capacitor circuit 1211 may be provided on a first layer 1210, which corresponds to the top surface of the printed circuit board 1200. Further, a first conductive pattern 1213 may be provided on the first layer 1210 of the printed circuit board 1200.

According to various embodiments, the printed circuit board 1200 may further include a communication circuit, and thus an electronic device (e.g., reference numeral 100 in FIG. 4A) and a pen input device (e.g., reference numeral 120 in FIG. 4A) may actively communicate with each other. Referring to FIG. 12, a second conductive pattern 1243 may be formed on a second layer 1240, which corresponds to the bottom surface of the printed circuit board 1200 according to one embodiment. A communication circuit B (e.g., a Bluetooth low energy (BLE) circuit) may be connected to the second conductive pattern 1243. The communication circuit B according to one embodiment may include an RFIC 1242a and an OSC 1242b, which are formed on a conductive pattern 1241 printed on the second layer 1240.

Conductive patterns 1221 and 1231 for generating a specific resonance frequency (e.g., 2.4 GHz) may be respectively formed on layers 1220 and 1230, which have not been described among the multiple layers illustrated in FIG. 12. The lengths or areas of the conductive patterns 1221 and 1231 may be changed depending on a resonance frequency value optimized for a specific pen input device (e.g., reference numeral 120 in FIG. 4A). According to one embodiment, some layers 1220 and 1230 may not include corresponding conductive patterns, and may be used only to provide a predetermined height to the printed circuit board 1200 in accordance with the dimension (or shape) of a pen housing (e.g., reference numeral 400 in FIG. 4C).

According to various embodiments of the disclosure, each of the multiple layers may have an embedded region 1212 configured to secure PEA performance. Conductive patterns for securing PEA performance may be formed in the embedded region 1212. According to various embodiments, antenna performance corresponding to the shape of a pen input device (e.g., reference numeral 120 in FIG. 4A) and the specifications of a printed circuit board and various electronic components may be secured by forming the shapes and lengths of the conductive patterns formed in the embedded region 1212 in uniform/non-uniform, symmetric/asymmetric, or typical/atypical types.

According to various embodiments, in the embedded region 1212, conductive vias (e.g., reference numerals 1214 and 1244) may be formed to pass through the multiple layers (e.g., reference numeral 1210 and 1240), respectively. According to various embodiments, when the multiple layers further include layers 1220 and 1230, which have not been described in the above-mentioned embodiments, conductive vias (e.g., reference numeral 1224 and 1234) may also be formed in the layers 1220 and 1230, which have not been described above. According to one embodiment, through the conductive vias, antennas on layers disposed at different heights may be connected to each other, or components and circuits that perform different functions may be electrically connected to each other.

FIG. 13 illustrates a printed circuit board 1300 (e.g., reference numeral 432 in FIG. 4C) including a PEA. The remaining circuit configuration is identical to that in FIG. 11, except that a controller 1310 is electrically connected to a PEA 1320 and a pattern is printed on the printed circuit board 1300 (e.g., reference numeral 432 in FIG. 4C). Therefore, hereinafter, a detailed description thereof will be omitted.

Figure 14:
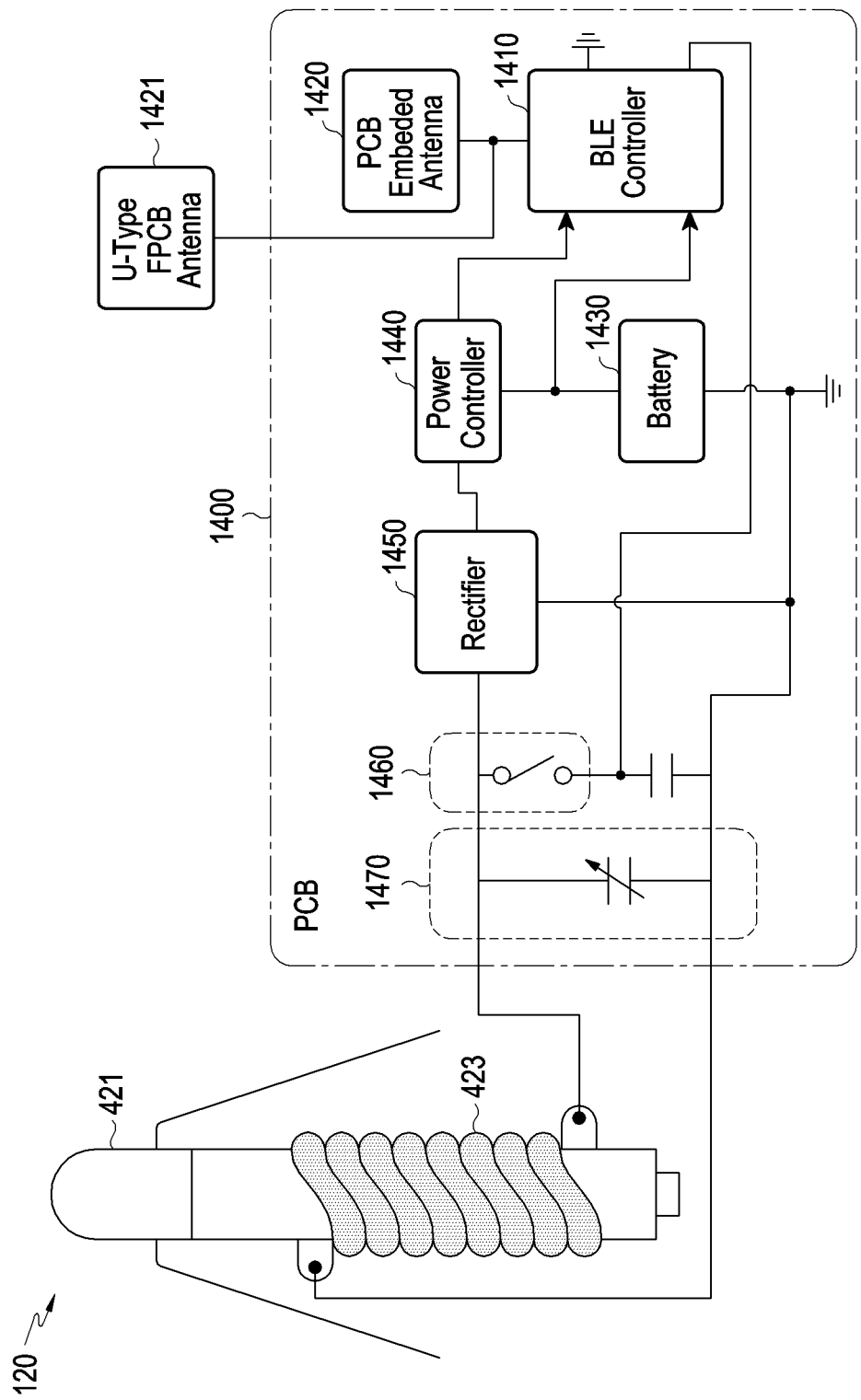
FIG. 14 is a view for describing the circuit configuration of a printed circuit board according to embodiments that are different from those of FIGS. 11 and 13.

FIG. 14 is a view for describing the circuit configuration of a printed circuit board 1400 (e.g., reference numeral 432 in FIG. 4C) according to embodiments that are different from those of FIGS. 11 and 13.

According to various embodiments, a U-Type antenna 1421 and a printed circuit board (PCB) embedded-type antenna (PEA) 1420 may be used together as antennas included in a pen input device (e.g., reference numeral 120 in FIG. 4A). In FIG. 14, the PEA 1420 and the U-type antenna 1421 are illustrated together as elements connected to a controller 1410. According to one embodiment, as a method for including the PEA 1420 and the U-type antenna 1421 together, an embedded region (e.g. reference numeral 1212 in FIG. 12) of the PEA 1420 and an antenna structure (e.g., reference numeral 500 in FIG. 4C) of the U-type antenna 1421 may be disposed parallel to each other.

Referring to FIGS. 12 to 14 together, in an embodiment in which the PEA 1420 and the U-type antenna 1421 are provided together, when seen from above a printed circuit board (e.g., reference numeral 1200 in FIG. 12), the printed circuit board (e.g., reference numeral 1200 in FIG. 12) and at least a portion of the antenna structure (e.g., reference numeral 500 in FIG. 4C) may be disposed parallel to each other while overlapping each other. For example, a conductive pattern (e.g. reference numeral 510 in FIG. 7B) of an antenna structure (e.g., reference numeral 500 in FIG. 4C) and a first conductive pattern (e.g., reference numeral 1213 in FIG. 12) of the printed circuit board (e.g., reference numeral 1200 in FIG. 12) may be opposite to each other. Thus, a second conductive portion (e.g., reference numeral 502 in FIG. 7A) and a third conductive portion (e.g., reference numeral 503 in FIG. 7B) of the antenna structure (e.g., reference numeral 500 in FIG. 4C) may be positioned at sides of the printed circuit board (e.g., reference numeral 1200 in FIG. 12).

According to various embodiments, in an embodiment in which the PEA 1420 and the U-type antenna 1421 are arranged in parallel, a printed circuit board (e.g., reference numeral 1200 in FIG. 12) may be disposed toward the tip (e.g., reference numeral 421 in FIG. 4C) of a pen input device (e.g., reference numeral 120 in FIG. 4A), and an antenna structure (e.g., reference numeral 500 in FIG. 4C) may be disposed toward a button part (e.g., reference numeral 413 in FIG. 4C) of the pen input device (e.g., reference numeral 120 in FIG. 4A).

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control, for example, at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by a component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or an external electronic device (e.g., an electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image and moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and support a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and at least one antenna appropriate for a communication scheme used in the communication network, such as the first network 1598 or the second network 1599, may be selected, for example, by the communication module 1590 from the one or more antennas. The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments of the disclosure may provide an electronic device including: a pen housing (e.g., reference numeral 400 in FIG. 4B), which is elongated, includes a first end (e.g., reference numeral 400*a* in FIG. 4B) and a second end (e.g., reference numeral 400*b* in FIG. 4B), and includes an inner space (e.g., reference numeral 401 in FIG. 4B); a tip (e.g., reference numeral 421 in FIG. 4B), which has a sharp end, is formed of a dielectric, and is positioned at the first end; a printed circuit board (PCB) (e.g., reference numeral 432 in FIG. 4C), which is elongated, is positioned in the inner space (e.g., reference numeral 401 in FIG. 4B), and includes a first surface (e.g., reference numeral 432*a* in FIG. 5B) facing a first direction and a second surface (e.g., reference numeral 432*b* in FIG. 5B) facing a second direction opposite to the first direction; a wireless communication circuit B2, which is positioned on the printed circuit board in the inner space; and an antenna structure (e.g., reference numeral 500 in FIG. 4C), which is positioned in the inner space 401 and is electrically connected to the wireless communication circuit (e.g., B2 in FIG. 5B), wherein the antenna structure includes: a first conductive portion (e.g., reference numeral 501 in FIG. 7A), which is positioned between the pen housing and the first surface of the printed circuit board; a second conductive portion (e.g., reference numeral 502 in FIG. 7A), which extends along the printed circuit board and is electrically connected to the first conductive portion in a third direction, which is different from the first direction and the second direction; and a third conductive portion (e.g., reference numeral 503 in FIG. 7A), which extends along the printed circuit board and is electrically connected to the first conductive portion in a fourth direction, which is different from the first direction, the second direction, and the third direction, and the printed circuit board is at least partially disposed between the second conductive portion and the third conductive portion when the first surface of the printed circuit board is seen from above.

According to various embodiments, the communication circuit may support a Bluetooth protocol.

According to various embodiments, the Bluetooth protocol may include a Bluetooth low energy (BLE) protocol.

According to various embodiments, the electronic device may further include a structure (e.g., reference numeral 600 in FIG. 4C) which is positioned in the inner space between the first conductive portion and the pen housing, comes into contact with the first conductive portion, and is formed of a dielectric.

According to various embodiments, the third direction may be substantially perpendicular to the first direction, and the fourth direction may be substantially perpendicular to the first direction.

According to various embodiments, the antenna structure may include a dielectric, and may include a dielectric structure in which the first to third conductive portions (e.g., reference numeral 501, 502, and 503 in FIG. 7A) are formed.

According to various embodiments, the first conductive portion may be at least partially disposed between the second conductive portion and the third conductive portion when seen from above the first conductive portion.

According to various embodiments, the pen housing is formed to have a cross section formed in an elliptical shape having a major axis and a minor axis, and the second conductive portion and the third conductive portion may be disposed at different positions in a direction parallel to the major axis.

According to various embodiments, when the antenna structure is mounted on the printed circuit board, the second conductive portion and the third conductive portion may extend in a direction away from the printed circuit board along the lengthwise direction of the pen housing.

According to various embodiments, the first end (e.g., reference numeral 400a in FIG. 4B) of the pen housing may be formed of a metal material, and the length of a conductive pattern on each of the second conductive portion and the third conductive portion may be determined based on a resonance frequency according to the material of the first end.

Various embodiments of the disclosure may provide an electronic device including: a pen housing (e.g., reference numeral 400 in FIG. 4B), which is elongated, includes a first end (e.g., reference numeral 400a in FIG. 4B) and a second end (e.g., reference numeral 400b in FIG. 4B), and includes an inner space (e.g., reference numeral 401 in FIG. 4B); a tip (e.g., reference numeral 421 in FIG. 4B), which has a sharp end, is formed of a dielectric, and is positioned at the first end (e.g., reference numeral 400a in FIG. 4B); a printed circuit board (PCB) (e.g., reference numeral 1200 in FIG. 12), which is elongated, is positioned in the inner space, and includes a first surface (e.g., reference numeral 432a in FIG. 5B) facing a first direction, a second surface (e.g., reference numeral 432b in FIG. 5B) facing a second direction opposite to the first direction, and multiple layers provided between the first surface and the second surface; a wireless communication circuit B, which is positioned on the printed circuit board in the inner space; a first conductive pattern (e.g., reference numeral 1213 in FIG. 12), which is formed on a first layer (e.g., reference numeral 1210 in FIG. 12) of the multiple layers and is electrically connected to the communication circuit; a second conductive pattern (e.g., reference numeral 1243 in FIG. 12), which is formed on a second layer (e.g., reference numeral 1240 in FIG. 12) separate from the first layer among the multiple layers; and at least one conductive via (e.g., reference numerals 1214 and 1244 in FIG. 12), which is formed in the printed circuit board and is electrically connected to the first conductive pattern and the second conductive pattern.

According to various embodiments, a tuning capacitor circuit (e.g., reference numeral 1211 in FIG. 12) may be included in the first layer, and a communication circuit may be disposed on the second layer.

According to various embodiments, the communication circuit B may be electrically connected to the first conductive pattern through the conductive via.

According to various embodiments, the electronic device may include an antenna structure which is positioned in the inner space and is electrically connected to the wireless communication circuit, wherein the antenna structure includes: a first conductive portion (e.g., reference numeral 501 in FIG. 7A) positioned between the pen housing and the first surface of the printed circuit board; a second conductive portion (e.g., reference numeral 502 in FIG. 7A), which extends along the printed circuit board and is electrically connected to the first conductive portion in a third direction, which is different from the first direction and the second direction; and a third conductive portion (e.g., reference numeral 503 in FIG. 7A), which extends along the printed circuit board and is electrically connected to the first conductive portion in a fourth direction, which is different from the first direction, the second direction, and the third direction, and the printed circuit board is at least partially disposed between the second conductive portion and the third conductive portion when the first surface of the printed circuit board is seen from above.

According to various embodiments, the first conductive portion of the antenna structure may be disposed above and parallel to the first conductive pattern.

Various embodiments of the disclosure may provide an electronic device (e.g., reference numeral 100 in FIG. 4A) including: a terminal housing, which includes a first plate (e.g., reference numeral 102 in FIG. 1), a second plate (e.g., reference numeral 111 in FIG. 2) oriented in a direction opposite to the first plate, and a side member (e.g., reference numeral 118 in FIG. 1) surrounding a receiving space between the first plate and the second plate; a hole (e.g., reference numeral 121 in FIG. 4A) formed in the side member and connected to the receiving space (e.g., reference numeral 122 in FIG. 4A); and a pen input device (e.g., reference numeral 120 in FIG. 4A) formed to be inserted into the receiving space through the hole, wherein the pen input device includes: a pen housing (e.g., reference numeral 400 in FIG. 4C) formed in an elliptical shape having a major axis and a minor axis when seen in a cross section thereof; a printed circuit board (PCB) (e.g., reference numeral 432 in FIG. 4C), which is positioned in an inner space of the pen housing and includes a first surface facing a first direction and a second surface facing a second direction opposite to the first direction; a wireless communication circuit (e.g., B2 in FIG. 5B) positioned on the printed circuit board in the inner space; and an antenna structure (e.g., reference numeral 500 in FIG. 4C), which is positioned in the inner space and is electrically connected to the wireless communication circuit, the antenna structure includes: a first conductive portion (e.g., reference numeral 501 in FIG. 7A), which is positioned between the pen housing and the first surface of the printed circuit board; a second conductive portion (e.g., reference numeral 502 in FIG. 7A), which extends along the printed circuit board and is electrically connected to the first conductive portion in a third direction, which is different from the first direction and the second direction; a third conductive portion (e.g., reference numeral 503 in FIG. 7A), which extends along the printed circuit board and is electrically connected to the first conductive portion in a fourth direction, which is different from the first direction, the second direction, and the third direction, and the printed circuit board is at least partially disposed between the second conductive portion and the third conductive portion when the first surface of the printed circuit board is seen from above.

According to various embodiments, the electronic device may further include a structure (e.g., reference numeral 600 in FIG. 4C) that is positioned in the inner space between the first conductive portion and the pen housing, comes into contact with the first conductive portion, and is formed of a dielectric.

According to various embodiments, the pen housing may have a cross section formed in an elliptical shape having a major axis and a minor axis, and the second conductive portion and the third conductive portion may be disposed at different positions in a direction parallel to the major axis.

According to various embodiments, the printed circuit board (PCB) may include multiple layers between the first surface and the second surface, and may include: a first conductive pattern (e.g., reference numeral 1213 in FIG. 12) formed on a first layer (e.g., reference numeral 1210 in FIG. 12) of the multiple layers and electrically connected to the wireless communication circuit; a second conductive pattern (e.g., reference numeral 1243 in FIG. 12) formed on a second layer (e.g., reference numeral 1240 in FIG. 12) separate from the first layer among the multiple layers; and at least one conductive via (e.g., reference numerals 1214 and 1244 in FIG. 12) formed in the printed circuit board and electrically connected to the first conductive pattern and the second conductive pattern.

According to various embodiments, the first conductive portion of the antenna structure may be disposed above and parallel to the first conductive pattern while facing the first conductive pattern.

Hereinabove, the disclosure has been shown and described with reference to certain embodiments thereof. However, it will be obvious to those skilled in the art that various changes in forms and details may be made therein without departing from the scope of the disclosure.

What is claimed is:

1. An electronic device comprising:
   a pen housing, which is elongated, comprises a first end and a second end, and includes an inner space;
   a tip, which has a sharp end, is formed of a dielectric, and is positioned at the first end;
   a printed circuit board (PCB), which is elongated, is positioned in the inner space, and includes a first surface facing a first direction and a second surface facing a second direction opposite to the first direction;
   a wireless communication circuit positioned on the printed circuit board in the inner space; and
   an antenna structure positioned in the inner space and electrically connected to the wireless communication circuit,
   wherein the antenna structure comprises:
   a first conductive portion positioned between the pen housing and the first surface of the printed circuit board;
   a second conductive portion, which extends along the printed circuit board and is electrically connected to the first conductive portion while facing a third direction different from the first direction and the second direction; and
   a third conductive portion, which extends along the printed circuit board and is electrically connected to the first conductive portion while facing a fourth direction different from the first direction, the second direction, and the third direction, and
   wherein the printed circuit board is at least partially disposed between the second conductive portion and the third conductive portion when the first surface of the printed circuit board is seen from above.

2. The electronic device of claim 1, wherein the communication circuit supports a Bluetooth protocol.

3. The electronic device of claim 2, wherein the Bluetooth protocol comprises a Bluetooth low energy (BLE) protocol.

4. The electronic device of claim 1, further comprising a structure, which is positioned in the inner space between the first conductive portion and the pen housing, comes into contact with the first conductive portion, and is formed of a dielectric.

5. The electronic device of claim 1, wherein the third direction is perpendicular to the first direction and the fourth direction is perpendicular to the first direction.

6. The electronic device of claim 1, wherein the antenna structure comprises a dielectric, and comprises a dielectric structure in which the first to third conductive portions are formed.

7. The electronic device of claim 1, wherein the first conductive portion is at least partially disposed between the second conductive portion and the third conductive portion when seen from above the first conductive portion.

8. The electronic device of claim 1, wherein the pen housing is formed to have a cross section formed in an elliptical shape having a major axis and a minor axis, and the second conductive portion and the third conductive portion may be disposed at different positions in a direction parallel to the major axis.

9. The electronic device of claim 1, wherein, when the antenna structure is mounted on the printed circuit board, the second conductive portion and the third conductive portion extend in a direction away from the printed circuit board along a lengthwise direction of the pen housing.

10. The electronic device of claim 1, wherein the first end of the pen housing is formed of a metal material.

11. The electronic device of claim 1, wherein the printed circuit board comprises multiple layers between the first surface and the second surface, and comprises:
    a first conductive pattern formed on a first layer of the multiple layers and electrically connected to the communication circuit;
    a second conductive pattern formed on a second layer separate from the first layer among the multiple layers; and
    at least one conductive via formed in the printed circuit board and electrically connected to the first conductive pattern and the second conductive pattern.

12. The electronic device of claim 11, wherein a tuning capacitor circuit is included in the first layer, the communication circuit is disposed on the second layer, and the communication circuit is electrically connected to the first conductive pattern through the at least one conductive via.

13. The electronic device of claim 11, wherein the antenna structure is positioned in the inner space and is electrically connected to the wireless communication circuit,
    the antenna structure comprises:
    a first conductive portion positioned between the pen housing and the first surface of the printed circuit board;
    a second conductive portion, which extends along the printed circuit board and is electrically connected to the first conductive portion while facing a third direction different from the first direction and the second direction; and
    a third conductive portion, which extends along the printed circuit board and is electrically connected to the first conductive portion while facing a fourth direction different from the first direction, the second direction, and the third direction, and
    wherein the printed circuit board is at least partially disposed between the second conductive portion and the third conductive portion when the first surface of the printed circuit board is seen from above.

14. The electronic device of claim 11, wherein the first conductive portion of the antenna structure is disposed above and parallel to the first conductive pattern while facing the first conductive pattern.

15. An electronic device, which comprises the electronic device of claim 1 as a pen input device and comprises:
- a terminal housing, which comprises a first plate, a second plate oriented in a direction opposite to the first plate, and a side member surrounding a receiving space between the first plate and the second plate; and
- a hole, which is formed in the side member and is connected to the receiving space through the hole; and
- wherein the pen input device is inserted into the receiving space through the hole.

* * * * *